US009238196B2

(12) United States Patent
Schwefer et al.

(10) Patent No.: US 9,238,196 B2
(45) Date of Patent: Jan. 19, 2016

(54) DEVICE AND METHOD FOR ELIMINATING $NO_x$ AND $N_2O$

(71) Applicants: Meinhard Schwefer, Meschede (DE); Rolf Siefert, Rheda-Wiedenbrück (DE); Stefan Pinnow, Elsdorf (DE)

(72) Inventors: Meinhard Schwefer, Meschede (DE); Rolf Siefert, Rheda-Wiedenbrück (DE); Stefan Pinnow, Elsdorf (DE)

(73) Assignee: ThyssenKrupp Industrial Solutions AG, Essen (DE)

( * ) Notice: Subject to any disclaimer, the term of this patent is extended or adjusted under 35 U.S.C. 154(b) by 0 days.

(21) Appl. No.: 14/365,949

(22) PCT Filed: Dec. 8, 2012

(86) PCT No.: PCT/EP2012/005082
§ 371 (c)(1),
(2) Date: Jun. 27, 2014

(87) PCT Pub. No.: WO2013/087181
PCT Pub. Date: Jun. 20, 2013

(65) Prior Publication Data
US 2014/0363359 A1   Dec. 11, 2014

(30) Foreign Application Priority Data
Dec. 16, 2011   (DE) .......................... 10 2011 121 188

(51) Int. Cl.
*B01D 53/56* (2006.01)
*B01D 53/86* (2006.01)

(52) U.S. Cl.
CPC .......... *B01D 53/869* (2013.01); *B01D 53/8631* (2013.01); *B01D 53/8696* (2013.01);
(Continued)

(58) Field of Classification Search
CPC .. B01D 53/56; B01D 53/565; B01D 53/8628; B01D 53/8631; B01D 53/8696; B01D 53/869; B01D 2255/1025; B01D 2255/20738; B01D 2255/20746; B01D 2255/20761; B01D 2255/50; B01D 2255/9202; B01D 2257/402; B01D 2257/404
USPC ........................................................ 423/239.2
See application file for complete search history.

(56) References Cited

U.S. PATENT DOCUMENTS 5,547,650 A * 8/1996 Edgar et al. .................... 423/235
7,914,747 B1 * 3/2011 Kraemer ....................... 422/170
(Continued)

FOREIGN PATENT DOCUMENTS

CA     2229416 A1 *  3/1997  ............. B01D 53/56
CA     2397265 A1 *  7/2001  ............. B01D 53/86
(Continued)

OTHER PUBLICATIONS

German Language International Search Report for International PCT Patent Application No. PCT/EP2012/005082; mailing date Mar. 7, 2013.
(Continued)

*Primary Examiner* — Timothy Vanoy
(74) *Attorney, Agent, or Firm* — ThyssenKrupp North America, Inc.

(57) ABSTRACT

Disclosed herein is a device and method for lowering the content of $NO_x$ and $N_2O$ in gases. The device comprises a container having therein two reaction steps connected in series. The first step removes $NO_x$ ($DeNO_x$ stage) by reducing $NO_x$ with a nitrogen-containing reducing agent. Downstream thereof, the second step removes $N_2O$ by catalytic decomposition of $N_2O$ to $N_2$ and $O_2$ ($DeN_2O$ stage). Each step comprises one or more catalyst beds through which flows gas to be purified. The catalyst bed of the $DeNO_x$ stage containing zeolites doped with transition metals, including lanthanides. The at least one catalyst bed of the $DeN_2O$-stage contains one or more catalytically active compounds of elements selected from groups 5 to 11 of the Periodic Table, but not iron-doped zeolites. A device for introducing a nitrogen-containing reducing agent into the stream of the $NO_x$ and $N_2O$-containing gas is further disposed upstream of the $DeNO_x$ stage.

17 Claims, 11 Drawing Sheets

(52) U.S. Cl.
CPC ..... *B01D53/8628* (2013.01); *B01D 2255/1025* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01D 2255/9202* (2013.01); *B01D 2257/402* (2013.01); *B01D 2257/404* (2013.01); *Y02C 20/10* (2013.01)

(56) References Cited

U.S. PATENT DOCUMENTS

| | | | |
|---|---|---|---|
| 2002/0127163 A1 | 9/2002 | Chen | |
| 2003/0143142 A1* | 7/2003 | Schwefer et al. | 423/239.2 |
| 2005/0244320 A1* | 11/2005 | Schwefer et al. | 423/239.2 |

FOREIGN PATENT DOCUMENTS

| | | | | |
|---|---|---|---|---|
| DE | 10112444 A1 * | 10/2002 | ............ | B01D 53/02 |
| JP | H06126177 A | 5/1994 | | |
| WO | 01/58570 A1 | 8/2001 | | |
| WO | 02/060563 A1 | 8/2002 | | |

OTHER PUBLICATIONS

English translation of International Search Report for International PCT Patent Application No. PCT/EP2012/005082; mailing date Mar. 7, 2013.

\* cited by examiner

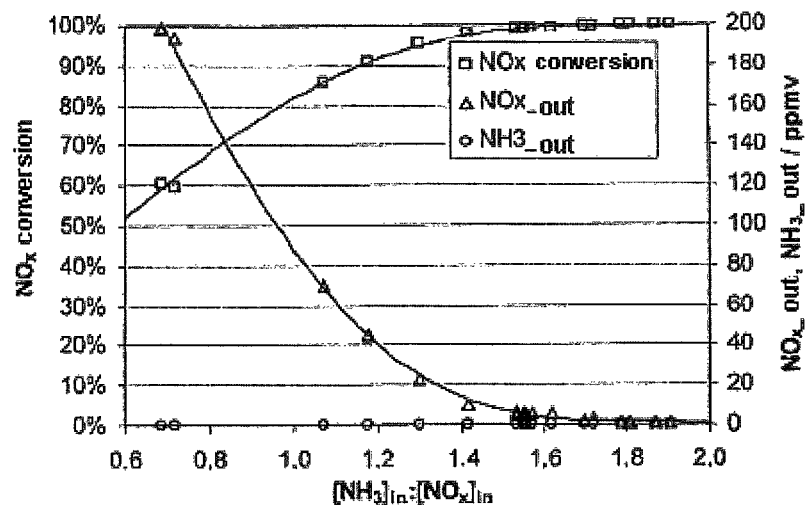
Figure 7: Results of experiment 1
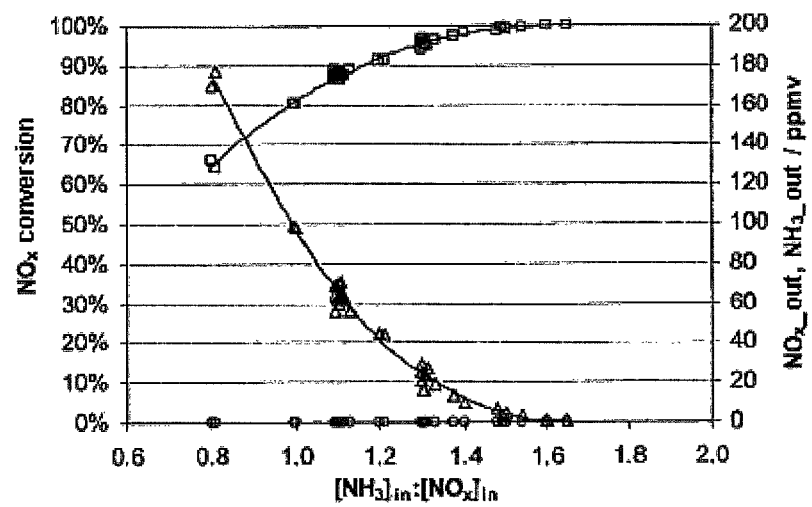
Figure 8: Results of experiment 2

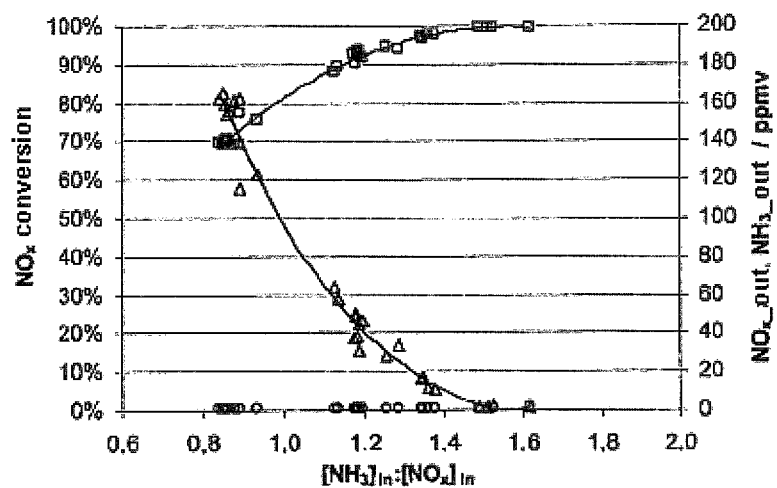
Figure 9: Results of experiment 3
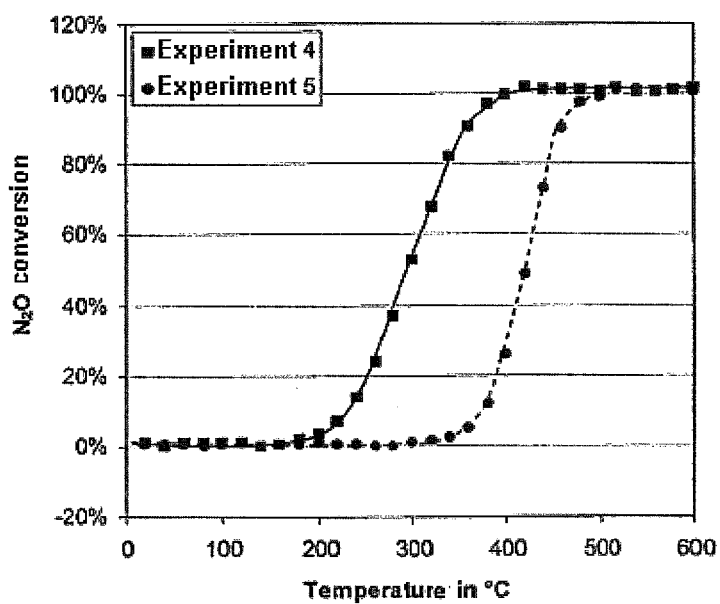
Figure 10: Results of experiments 4 and 5

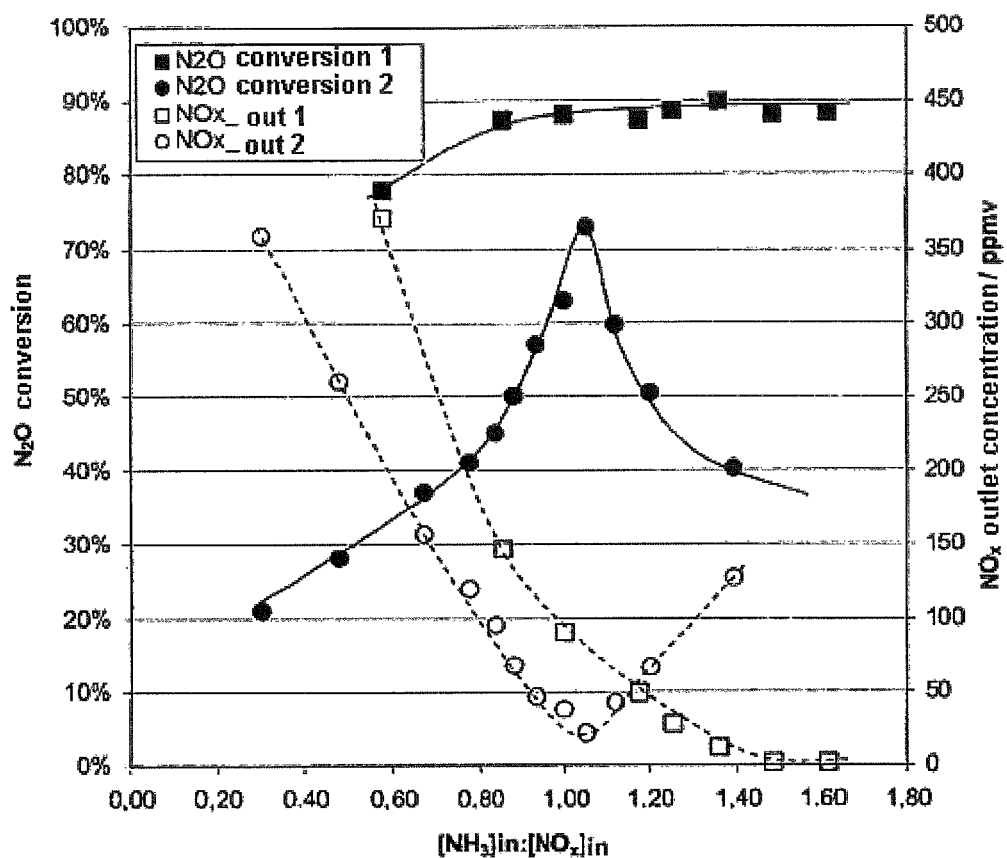
Figure 11: Experimental results of examples 1 and 2

DEVICE AND METHOD FOR ELIMINATING $NO_x$ AND $N_2O$

CROSS REFERENCE TO RELATED APPLICATIONS

This application is a U.S. National Stage Entry of International Patent Application Serial Number PCT/EP2012/005082, filed Dec. 8, 2012.

FIELD

The invention relates to an apparatus and method for catalytically eliminating $NO_X$ and $N_2O$.

BACKGROUND

Many processes, for example combustion processes or the industrial production of nitric acid or caprolactam, result in an offgas laden with nitrogen monoxide NO, nitrogen dioxide $NO_2$ (referred to collectively as $NO_X$), and dinitrogen monoxide $N_2O$. While NO and $NO_2$ have long been known as compounds of relevance for environmental toxicology (acid rain, smog formation) and global limits have been fixed for the maximum permissible emissions thereof, dinitrogen monoxide has also gained increasing attention in the field of environmental conservation in the last decade, since it contributes to a not inconsiderable degree to the degradation of stratospheric ozone and to the greenhouse effect. For reasons of environmental conservation, there is therefore an urgent need for technical solutions for eliminating dinitrogen monoxide emissions together with the $NO_X$ emissions.

There are already numerous known means of eliminating $N_2O$ on the one hand and $NO_X$ on the other hand.

In the case of $NO_X$ reduction, the selective catalytic reduction (SCR) of $NO_X$ by means of ammonia in the presence of vanadium-containing $TiO_2$ catalysts should be emphasized (cf., for instance, G. Ertl, H. Knözinger, J. Weitkamp: Handbook of Heterogeneous Catalysis, vol. 4, pages 1633-1668, VCH Weinheim (1997)). According to the catalyst, this can proceed at temperatures of about 150 to about 450° C., and is conducted on the industrial scale preferably between 200 and 400° C., especially between 250 and 350° C. It is the most commonly used variant for reducing $NO_X$ levels in offgases from industrial processes and, given appropriate dimensions of the catalyst beds, enables an $NO_X$ decomposition of more than 90%.

There are also processes for reducing $NO_X$ that are based on zeolite catalysts, which proceed using a wide variety of different reducing agents. As well as Cu-exchanged zeolites (cf., for example, EP-A-914,866), iron-containing zeolites in particular appear to be of interest for practical applications.

For instance, U.S. Pat. No. 5,451,387 and EP-A-756,891 describe processes for selective catalytic reduction of $NO_X$ with $NH_3$ over iron-exchanged zeolites, which work preferentially at temperatures between 200 and 550° C., especially around 400° C.

In contrast to reducing $NO_X$ levels in offgases, which has been established in industry for many years, there exist only comparatively few industrial processes for $N_2O$ elimination, which are usually aimed at a thermal or catalytic decomposition of the $N_2O$. An overview of the catalysts, which have been demonstrated in principle to be suitable for decomposition and for reduction of dinitrogen monoxide is given by Kapteijn et al. (Kapteijn F. et al., Appl. Cat. B: Environmental 9 (1996) 25-64). The catalytic decomposition of dinitrogen monoxide to $N_2$ and $O_2$ offers the advantage over catalytic reduction with selected reducing agents, such as $NH_3$ or hydrocarbons, that no costs arise for the consumption of reducing agents. However, an effective reduction in $N_2O$ levels based on a catalytic breakdown, in contrast to reduction of $N_2O$ or else $NO_X$, can be achieved effectively with the customary breakdown catalysts only at temperatures greater than 400° C., preferably greater than 450° C.

Again, transition metal-laden zeolite catalysts appear to be particularly suitable for catalytic breakdown of the $N_2O$ to $N_2$ and $O_2$ (U.S. Pat. No. 5,171,553).

Iron-laden zeolite catalysts are described as especially advantageous (for example in EP-A-955,080 or WO-A-99/34,901). The activity of the Fe-zeolite catalysts for $N_2O$ breakdown is enhanced considerably by the simultaneous presence of $NO_X$, as demonstrated scientifically, for example, by Kögel et al. in Catalysis Communications 2 (2001) 273-276 or by Perez-Ramirez et al. in Journal of Catalysis 208 (2003) 211-223.

This property appears to apply exclusively to iron-doped zeolites. Zeolites doped with other transition metals such as copper or cobalt do not show this behavior.

In many cases, $N_2O$ breakdown is actually inhibited by the presence of $NO_X$, as known, for example, from Applied Catalysis B: Environmental 9 (1996) 25-64 [ch. 5.1], Applied Catalysis B: Environmental 12 (1997) 277-286 and from Catalysis Today 35 (1997) 113-120. This relates, for example, to Cu-, Co- and Rh-containing catalysts, which, in the absence of $NO_X$, exhibit a very high activity for $N_2O$ breakdown, but in the presence of $NO_X$ have a distinctly reduced activity. Catalysts of this kind are referred to hereinafter as "$NO_X$-sensitive".

As well as the aforementioned catalysts and methods for $NO_X$ reduction and for $N_2O$ breakdown, the patent literature also describes combined methods for elimination of $NO_X$ and $N_2O$. These are, for example, methods based on a catalytic reduction of $NO_X$ with $NH_3$ (in a $deNO_X$ stage) and a catalytic breakdown of $N_2O$ to $N_2$ and $O_2$ over iron-containing zeolite catalysts (in a $deN_2O$ stage).

For example, WO-A-01/51,182 describes a method for eliminating $NO_X$ and $N_2O$ from the residual gas from nitric acid production, wherein the offgas to be cleaned is passed first through a $deNO_X$ stage and then through a $deN_2O$ stage with iron-laden zeolite catalysts. In the upstream $deNO_X$ stage, the $NO_X$ content is reduced to such an extent that an optimal $NO_X/N_2O$ ratio of 0.001 to 0.5 is established, which leads to accelerated $N_2O$ decomposition in the downstream $deN_2O$ stage. Details of the apparatus configuration of this method are not disclosed.

The sequence of process stages described in WO-A-01/51,182 is very advantageous from a process or chemical engineering point of view, since the method is arranged in a rising temperature profile in the residual gas from the nitric acid production, between the absorption tower and residual gas turbine; in other words, the residual gas at first, prior to entry into the $deNO_X$ stage, has a low inlet temperature of <400° C., preferably <350° C., such that it is also possible to use conventional $deNO_X$ catalysts based on $V_2O_5$—$TiO_2$. After the $deNO_X$ stage, prior to entry into the $deN_2O$ stage, there is then a (single) heating operation of the residual gas up to 350 to 500° C., such that effective catalytic $N_2O$ breakdown is possible. The offgas is then sent to a residual gas turbine in which the heat content of the offgas is recovered with decompression and cooling of the offgas.

A reverse connection of the two method stages, i.e. in a sequence in which first the $N_2O$ decomposition is envisaged, and then the $NO_X$ decomposition is effected, is also possible, as taught in WO-A-97/10,042, WO-A-01/51,181, WO-A-03/

105,998 and WO-A-2006/119,870. WO-A-01/51,181 gives a detailed description not just of the method but also of an apparatus for conduction thereof. The latter is characterized by a sequence of two series-connected catalyst beds, with radial flow of the gas through at least one of them, and with the obligatory presence, between the catalyst beds, of an apparatus for introduction of a gaseous reducing agent into the gas stream leaving the first catalyst bed. In this method, the offgas is passed typically at a homogeneous temperature of <500° C. through two reaction zones containing iron-laden zeolite catalysts, which may be spatially separate from one another or connected to one another. In this method, $N_2O$ breakdown is effected first in the $deN_2O$ stage at an unreduced $NO_X$ content, i.e. with full exploitation of the co-catalytic $NO_X$ effect on the $N_2O$ breakdown, and then, after intermediate addition of ammonia, catalytic $NO_X$ reduction is effected. Since the $NO_X$ reduction should preferably proceed at the same temperature as the $N_2O$ breakdown, Fe-zeolite catalysts are likewise used in the $deNO_X$ stage, these catalysts, in contrast to conventional SCR catalysts, for example $V_2O_5$—$TiO_2$-based catalysts, also being operable at higher temperatures >400° C. Intermediate cooling of the process gas is therefore not required.

Finally, JP-A-06/126,177 discloses the combined elimination of $NO_X$ and $N_2O$ based on a catalytic reduction of the $NO_X$ with $NH_3$ (in a $deNO_X$ stage) and a catalytic breakdown of $N_2O$ to $N_2$ and $O_2$ (in a $deN_2O$ stage). The sequence of stages according to this document may be as desired. For the breakdown of the $N_2O$, a supported catalyst is proposed, containing 0.001 to 2% by weight of metallic platinum or rhodium or metallic rhodium and copper. As well as these metals, iridium, ruthenium, iron, cobalt and nickel are also proposed. Support materials mentioned are aluminum oxide, silicon dioxide and zirconium dioxide, and also zeolites. Details of the selection of the catalysts for the reduction of $NO_X$ are not disclosed here.

The parallel chemical reduction of $NO_X$ and $N_2O$ has also already been described. In this context, it is known that the $NO_X$ reduction proceeds considerably more quickly than the $N_2O$ reduction. In this reduction method, a nitrogen-containing reducing gas, for example ammonia, is typically used for the $NO_X$ reduction, while the same reducing gas, such as ammonia, but also hydrogen, a hydrocarbon or carbon monoxide, is typically used for the $N_2O$ reduction. Examples of such methods can be found in WO-A-03/84,646 and in U.S. Pat. No. 4,571,326. The method according to U.S. Pat. No. 4,571,326 can also be conducted in one catalyst bed or in a sequence of a plurality of catalyst beds. Because of the relatively rapid reduction of the $NO_X$, two zones form when one catalyst bed is used, with reduction principally of $NO_X$ in the first zone and reduction principally of $N_2O$ in the downstream, directly adjoining zone. This variant is shown, for example, in FIG. 4 of U.S. Pat. No. 4,571,329. FIG. 5 of U.S. Pat. No. 4,571,329 shows a sequence of two catalyst beds; these directly adjoin one another and form a zone in which principally $NO_X$ is reduced, followed by a zone in which principally $N_2O$ is reduced. Catalysts used for the $N_2O$ reduction are selected iron- or hydrogen-doped zeolites.

US-A-2002/0127163 describes a method for selective catalytic reduction of $N_2O$ with ammonia. Catalysts used are zeolites, which have preferably been doped with metals. This reduction method can be combined with an $NO_X$ reduction. FIG. 10 of this document demonstrates that methods of this kind can be conducted in one catalyst bed, or in a sequence of a plurality of catalyst beds. Accordingly, it is possible to conduct either a simultaneous reduction of $NO_X$ and $N_2O$ or else a first reduction of $N_2O$ followed by a reduction of the $NO_X$. For catalytic reduction of $N_2O$, a minimum amount of 0.5 mol of ammonia per mole of $N_2O$ is required. According to the description, the sequence of the reduction stages is controlled by the selection of the catalysts. A catalytic breakdown of the $N_2O$ to nitrogen and oxygen is explicitly not the subject of the invention disclosed.

The patent literature discloses reactors for a wide variety of different gas phase reactions including a sequence of at least two catalyst beds.

U.S. Pat. No. 2,475,855 describes a reactor for catalytic endo- or exothermic reactions, with a plurality of radial catalyst beds in the interior thereof. These are arranged separately from one another and have an axial line in which reactants are supplied to the catalyst and flow through it radially. The reverse flow direction is also possible. The reactor is used, for example, in the catalytic cracking of hydrocarbons.

U.S. Pat. No. 4,372,920 describes a reactor for heterogeneously catalyzed gas phase reactions, likewise with a plurality of radial catalyst beds in the interior thereof. These are arranged separately from one another and likewise have an axial line. The reactants flow axially through parts of the individual catalyst beds and radially through other parts of these catalyst beds. The reactor can be used, for example, for synthesis of ammonia or of methanol.

EP-A-1,022,056 describes a reactor for the treatment of fluids, comprising two directly adjoining beds of adsorbents or catalysts in a vessel. The beds consist of granules of different particle size, the lowermost bed having the coarser particle size. Arranged in between is a perforated plate, the holes of which have diameters greater than the diameter of the particles in the upper bed and smaller than the diameter of the lower bed. The reactor can be used for filtration, cleaning, separation and catalytic conversion of fluids.

U.S. Pat. No. 3,733,181 describes a reactor for the catalytic reduction of nitrogen oxides and for the catalytic oxidation of hydrocarbons and of carbon monoxide from offgases. The reactor comprises a combination of two concentric beds of catalysts for the two reactions, through which the offgas is passed in succession. Between the two beds, air is supplied to the offgas to be treated.

EP-A-967,006 discloses an apparatus for performance of catalytic reactions of a fluid in the gas phase. This comprises, in a reactor, an arrangement of two catalyst beds directly adjoining one another, each in essentially cylindrical form, with radial flow through one and axial flow through the other. This apparatus can be used, for example, in the desulfurization of natural gas.

To date, in commercial methods for combined reduction of $NO_X$ and breakdown of $N_2O$ in gases in the low to moderate temperature range at about 200 to 600® C., principally iron-doped zeolites are used. As described above, catalysts of this kind are notable in particular firstly for a very high activity for $NO_X$ reduction by means of ammonia and secondly for a high activity for breakdown of $N_2O$, which is distinctly enhanced in the presence of $NO_X$.

Other catalysts for the breakdown of $N_2O$ which are deactivated by the simultaneous presence of $NO_X$ can be used only under special conditions in industrial practice, i.e. in gases containing both $NO_X$ and $N_2O$. It would be desirable if the use spectrum of such catalysts could be broadened, such that these catalysts could likewise be used in the removal of nitrogen oxides from offgases.

On the basis of the information available to date about catalysts other than iron-doped zeolites which would be usable for catalytic breakdown of $N_2O$, a combined process for removal of nitrogen oxides from gases would be envisaged for these other catalysts, in which very substantial $NO_X$ reduction with ammonia, for example, takes place in a first stage, and then the remaining $N_2O$ would be broken down or reduced in a downstream stage. Such a more or less complete removal of the $NO_X$ in the first stage could be effected by the addition of appropriately large amounts of ammonia. In this case, however, when conventional SCR catalysts are used, for example those based on $V_2O_5$—$TiO_2$, there is the risk that, in the case of limited amounts of catalyst, not the entire amount of added ammonia will in fact react with $NO_X$, thus resulting in unwanted slippage of ammonia. This is problematic in the case of combined $NO_X$ reduction and $N_2O$ breakdown because the ammonia then gets into the downstream $deN_2O$ stage and, when zeolites not doped with transition metals are used, is oxidized at least partly to $NO_X$, i.e. to NO and $NO_2$. This in turn leads to partial inhibition or deactivation of the $deN_2O$ catalyst.

Moreover, it is known that the conventional SCR catalysts are generally usable only at temperatures of up to 400° C. In order to avoid stepwise heating of the gas stream to be treated and to enable a simple apparatus configuration, both stages of the nitrogen oxide degradation, i.e. the $deNO_X$ stage and the $deN_2O$ stage, should be operated at approximately equal temperatures.

SUMMARY

It is thus an object of the present invention to provide an apparatus and a method for very substantial removal of $N_2O$ and $NO_X$ from gases, in which a combination of selected $deNO_X$ catalysts with catalysts which have been usable to date only to a limited degree, if at all, is used for the catalytic breakdown of $N_2O$. At the same time, particularly catalysts for $NO_X$ reduction or for $N_2O$ breakdown which feature a very high catalytic efficiency are to be used.

It is a further object of the present invention to provide an apparatus and a method which can be operated in a simple and economically favorable manner.

It has now been found that, surprisingly, the combination of selected zeolites in the $deNO_X$ stage with selected catalysts in the $deN_2O$ stage permits an extremely economically viable removal, which is very simple in terms of apparatus, of nitrogen oxides from gases.

The zeolite catalysts selected for the $deNO_X$ stage, because of their high activity in the temperature range from about 350 to 600° C., can be used without any problem and are combined with $deN_2O$ catalysts that are active within the same temperature range.

The inventive use of zeolites doped with transition metals as $deNO_X$ catalysts has several advantages over conventional SCR catalysts, for example based on $V_2O_5$—$WO_3/TiO_2$ or $Pt/Al_2O_3$.

Firstly, these zeolites are highly active and selective within the range of moderate temperatures up to 600=C, whereas conventional $V_2O_5$—$WO_3/TiO_2$ catalysts can be used only at temperatures up to about 400° C. Thus, these zeolites allow combination with $deN_2O$ catalysts of high activity within the range of moderate temperatures.

A further crucial advantage of the zeolites doped with transition metals as $deNO_X$ catalysts compared to conventional SCR catalysts is the behavior thereof in the event of overdosage of reducing agent.

As mentioned above, such an overdosage of reducing agent, i.e. a superstoichiometric addition of $NH_3$ in relation to the reduction stoichiometry—for example the reaction of $NO_X$ with $NH_3$, which is known to proceed in a molar ratio of 1:1—is very advantageous for achieving very substantial $NO_X$ reduction.

While ammonia dosed in excess, when conventional SCR catalysts are used, very substantially slips through the catalyst bed and gets into the downstream $deN_2O$ catalyst, where it is then oxidized at least partly to $NO_X$, such $NH_3$ slippage does not occur in the case of inventive use of a transition metal-doped zeolite catalyst. $NH_3$ which is dosed in excess and does not react with $NO_X$ is instead selectively oxidized over these catalysts by $O_2$ and/or $N_2O$ likewise present in the offgas to $N_2$ and $H_2O$ In this way, with a relatively small catalyst volume in the $deNO_X$ stage, complete reduction of the $NO_X$ can be achieved, such that, in the downstream $deN_2O$ stage, $NO_X$-sensitive catalysts can be used for $N_2O$ breakdown.

Complete $NO_X$ reduction without $NH_3$ slippage could be achieved with conventional SCR catalysts only in the case of correspondingly oversize dimensions of the catalyst bed, if at all. However, this approach is not economically viable compared to the method of the invention.

A further advantage in the case of use of zeolite catalysts doped with transition metals in the $deNO_X$ stage is finally that they simultaneously catalyze, as well as the reduction of the $NO_X$, the breakdown of the $N_2O$, such that a certain proportion of $N_2O$ is already decomposed in the $deNO_X$ stage. In a surprising and positive manner, this effect, especially when iron-doped zeolite catalysts are used in combination with $NO_X$-sensitive catalysts in the $deN_2O$ stage, means that the $N_2O$ decomposition over the two reaction stages has only a slight dependence on the $NO_X$ content at the outlets or at the inlet of the $deN_2O$ stage (cf. also FIG. 11).

BRIEF DESCRIPTION OF THE DRAWINGS

The present disclosure is described in detail below with reference to the attached drawing figure, wherein:

FIG. 7 is a graph depicting the results of Experiment 1 of the present disclosure.

FIG. 8 is a graph depicting the results of Experiment 2 of the present disclosure.

FIG. 9 is a graph depicting the results of Experiment 3 of the present disclosure.

FIG. 10 is a graph depicting the results of Experiments 4 and 5 of the present disclosure.

FIG. 11 is a graph depicting the experimental results of Examples 1 and 2 of the present disclosure.

DETAILED DESCRIPTION

Figure 1:
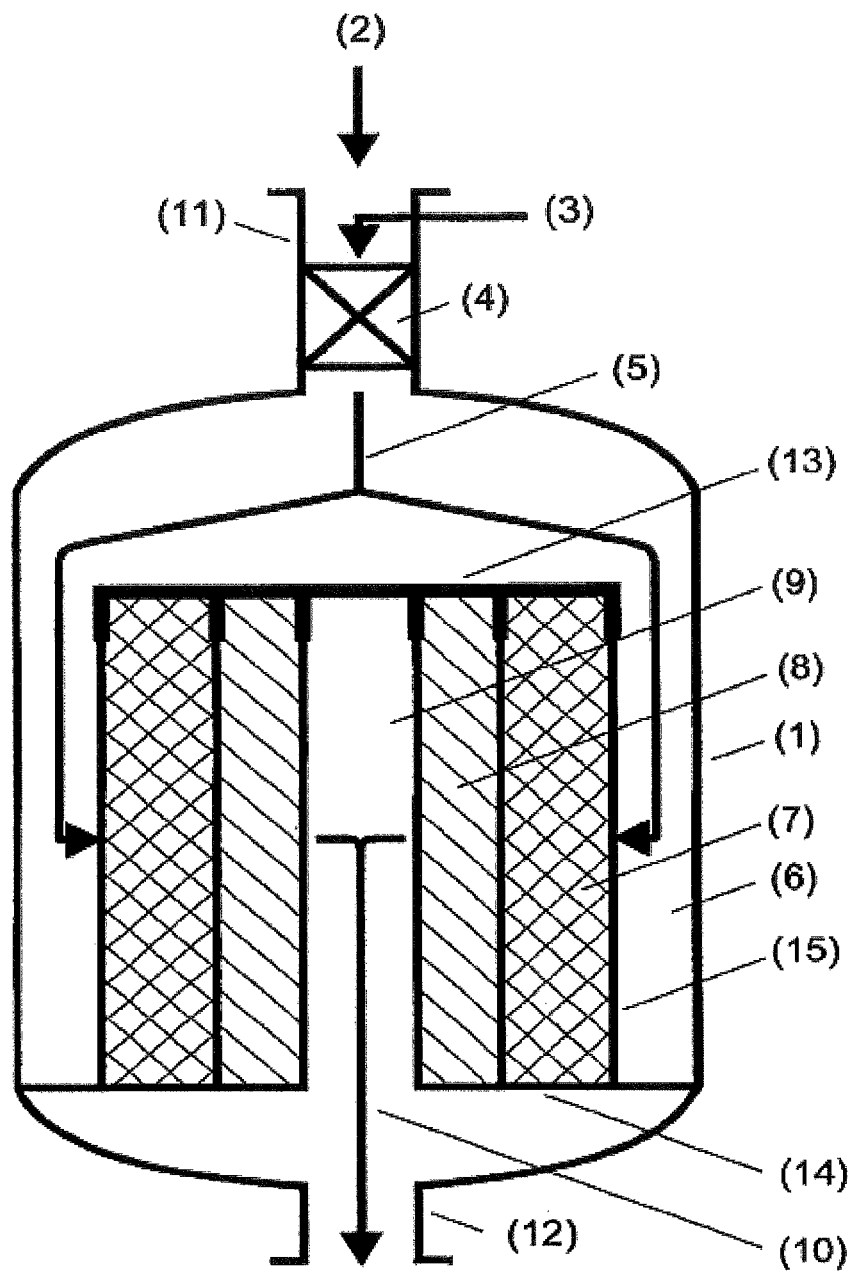
FIG. 1 is a side section view of a schematic embodiment of a reactor apparatus of the present disclosure, for reducing $NO_X$ and $N_2O$ gases from production offgases.

In the content of this application, $NO_X$-sensitive $deN_2O$ catalysts are understood to mean those $deN_2O$ catalysts where the catalytic $N_2O$ breakdown is significantly impaired by simultaneously presence of $NO_X$ in the gas stream to be treated, i.e. is significantly lowered under otherwise identical conditions. In the context of this application, catalysts are then $NO_X$-sensitive $deN_2O$ catalysts when the temperature at which, under the conditions of experiment 5 described hereinafter ($NO_X$ content=1000 ppm), a 50% $N_2O$ decomposition is achieved is at least 10K higher than the temperature for a 50% $N_2O$ decomposition under the conditions of experiment 4 described hereinafter ($NO_X$ content=0 ppm).

Overall, the aforementioned objects are achieved by the apparatus described hereinafter and the method described hereinafter.

The invention relates to an apparatus for lowering the content of $NO_X$ and $N_2O$ in gases, especially in process gases and offgases, comprising:

A) a vessel (1) and, arranged therein,
B) two series-connected reaction stages for the removal of $NO_X$ ($deNO_X$ stage) by reduction of $NO_X$ with a nitrogen-containing reducing agent and, connected downstream thereof, for the removal of $N_2O$ by catalytic breakdown of $N_2O$ in $N_2$ and $O_2$ ($deN_2O$ stage), each of which has one or more catalyst beds (7, 8) through which the gas to be cleaned flows, where
C) at least one catalyst bed in the $deNO_X$ stage (7) contains a catalyst for the reduction of $NO_X$ with nitrogen-containing reducing agents, which contains zeolites doped with transition metals, including the lanthanides,
D) at least one catalyst bed in the $deN_2O$ stage (8) contains a catalyst for the breakdown of $N_2O$ to $N_2$ and $O_2$, which contains one or more catalytic active compounds of elements selected from groups 5 to 11 of the Periodic Table of the Elements, excluding iron-doped zeolites, and
E) upstream of the $deNO_X$ stage (7) is provided an apparatus for introduction of a nitrogen-containing reducing agent into the stream of the gas containing $NO_X$ and $N_2O$.

The apparatus of the invention comprises a vessel A) in which the two reaction stages with the catalyst beds are accommodated. This may be a conventional pressure vessel which may be manufactured, for example, from steel. The vessel is equipped with inlet and outlet orifices for the gas to be cleaned, for the cleaned gas and for any auxiliaries to be introduced into the vessel, such as the reducing agent for $NO_X$. In addition, the vessel may be equipped with customary auxiliary devices, such as with manholes, flanges, stubs or removable covers.

The apparatus of the invention is characterized in that it has at least two reaction stages containing selected catalysts. The catalyst beds for these reaction stages may directly adjoin one another or else be arranged spaced apart from one another, for example by means of an empty spatial section which may optionally have flow-conducting or construction-supporting elements. This means that the gas that flows through these beds passes from one catalyst bed to the other without any kind of devices for modifying the composition of the gas, such as mixing or heating devices, connected between these catalyst beds. It is optionally possible for flow-conducting or catalyst bed-supporting or -stabilizing elements, such as perforated plates or wire mesh trays, to be provided between the catalyst beds.

Upstream of the $deNO_X$ stage is provided an apparatus E) for introducing a reducing agent for $NO_X$ into the stream of the gas containing $NO_X$ and $N_2O$. This may open into the inlet for the gas stream upstream of the introduction of the gas stream to be cleaned into the reactor, or else into the reactor upstream of the introduction of the gas stream into the first catalyst bed. The apparatus E) for introduction of a reducing agent for $NO_X$ into the stream of the gas containing $NO_X$ and $N_2O$ may be a simple inlet which preferably has one or more nozzles at the reactor end. The inlet may open directly into the line for the gas containing $NO_X$ and $N_2O$.

In a preferred embodiment, the apparatus of the invention contains at least one measurement point F) for the flow rate or the volume of the gas and/or at least one measurement point G) for the determination of the concentration of $NO_X$ (or one of the individual components thereof) in the gas. The measurement point F) is typically positioned upstream of the $deNO_X$ stage. The measurement point G) for the concentration of $NO_X$ present in the gas is upstream of the $deNO_X$ stage, downstream of the $deNO_X$ stage and upstream of the $deN_2O$ stage, or downstream of the $deN_2O$ stage.

In a particularly preferred embodiment of the apparatus of the invention, the measurement point G) is positioned downstream of the $deN_2O$ stage or more preferably upstream of the $deNO_X$ stage in the inlet for the gas which contains nitrogen oxides and is to be cleaned.

The value from the measurement point F) and the value from the measurement point G) can be used to ascertain and judge the amount of reducing agent required for the $deNO_X$ stage.

In a preferred embodiment of the apparatus of the invention, the measurement points F) and G) for determination of the amount of reducing agent fed in are coupled via a control or regulation unit H) to an adjustment device I), for example to a controllable or regulatable valve, with which the flow rate or the amount of the reducing agent flowing through the apparatus E) can be adjusted. The control or regulation unit H) gives an adjustment parameter for this, with which the adjustment device I) is activated in a suitable manner. Alternatively, it is also possible to supply a mixture of inert gas, for example nitrogen, and gaseous reducing agent to the gas containing nitrogen oxides; in this case, the amount of reducing agent supplied can be adjusted by varying the inert gas content. The person skilled in the art is aware of such dosage methods.

The arrangement of, configuration of and flow through the catalyst beds may take different forms.

Catalyst beds frequently have a geometric form which is smaller in one dimension than in the two other dimensions. In this case, the two greater dimensions define an area which can be used to describe the arrangement of the catalyst bed in the reactor. In the apparatus of the invention, the catalyst beds may be aligned parallel or at right angles to the main axis of the vessel with respect to these areas; also possible are combinations of catalyst beds aligned in parallel and at right angles or of those arranged at right angles and in parallel. The gas flows through the catalyst beds generally along the smaller dimension, i.e. at right angles to the area which is defined by the two greater dimensions. Such a flow is referred to hereinafter as "lateral flow".

Figure 3:
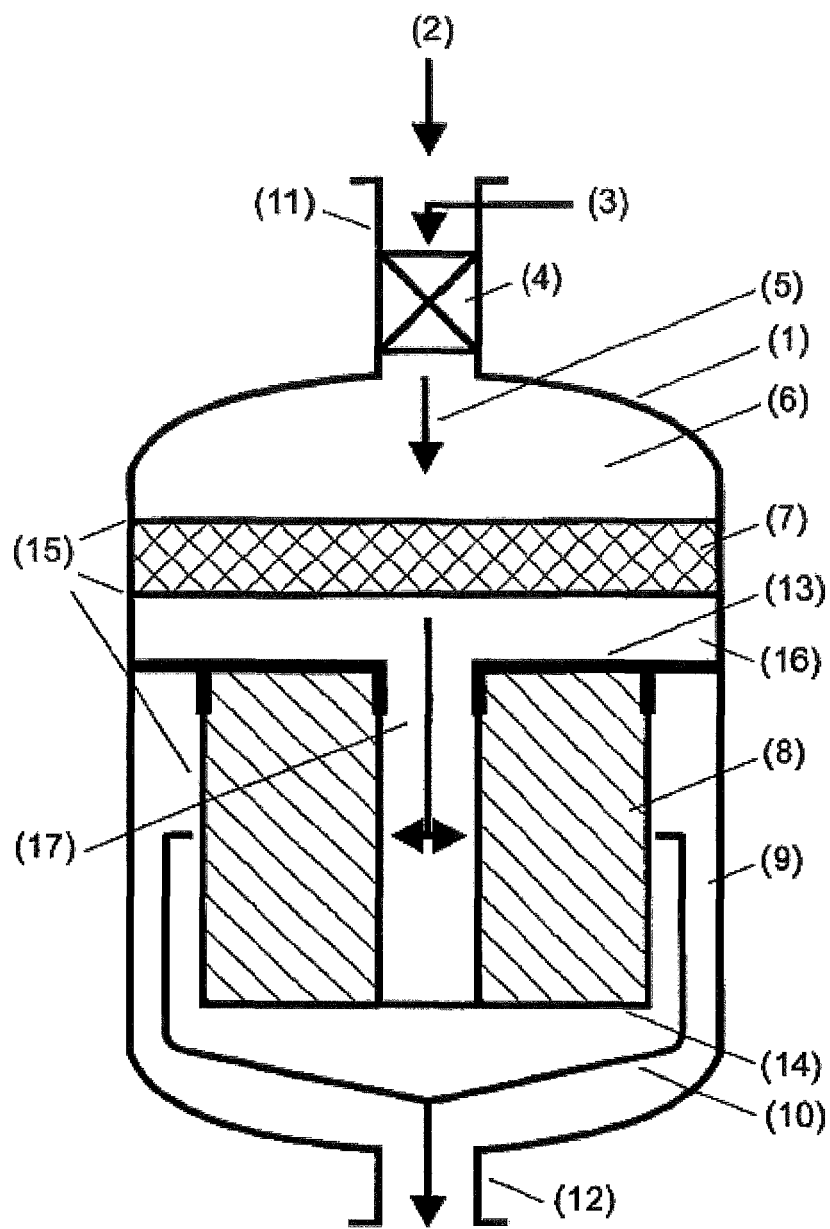
FIG. 3 is a side section view of a schematic embodiment of a reactor apparatus of the present disclosure, for reducing $NO_X$ and $N_2O$ gases from production offgases.
Figure 4:
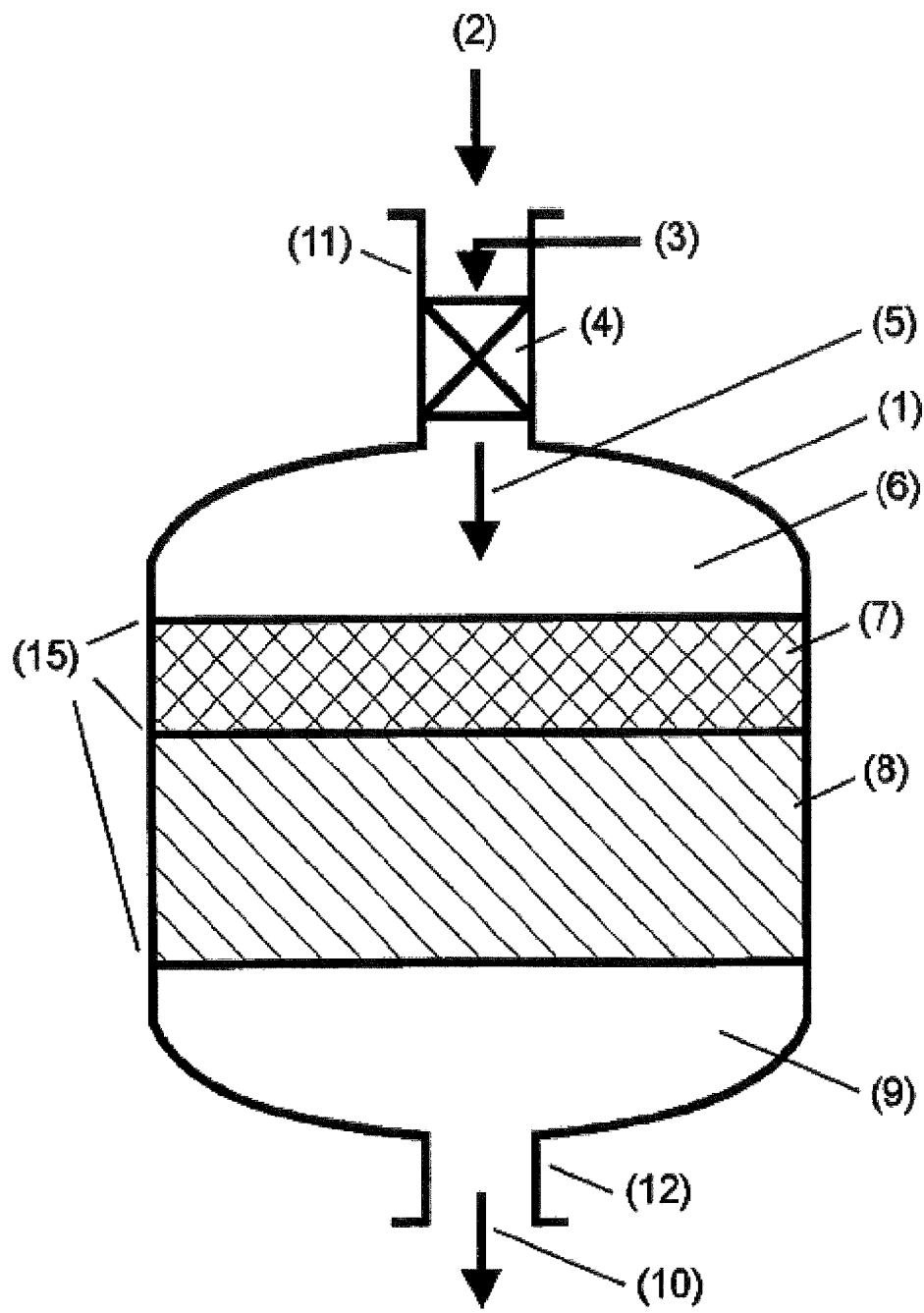
FIG. 4 is a side section view of a schematic embodiment of a reactor apparatus of the present disclosure, for reducing $NO_X$ and $N_2O$ gases from production offgases.

In the simplest configuration of the apparatus of the invention, the catalyst beds of the two reaction stages have the form of two or more superposed horizontal layers optionally separated by a cavity. The gas can be introduced, for example, from the top into the first catalyst arrangement for the reduction of the $NO_X$, and flows through this arrangement in the downward direction and subsequently flows first into any empty intermediate space and subsequently into the further catalyst arrangement(s) for the breakdown of the $N_2O$. The cleaned gas exits the last catalyst arrangement at the lower side into the outlet region of the reactor, and then leaves the reactor. Such a configuration of the apparatus of the invention is shown in FIGS. 3 and 4.

In a preferred embodiment of the apparatus of the invention, at least one catalyst bed in a reaction stage, preferably at least one catalyst bed in each reaction stage, is configured or arranged such that the gas to be cleaned flows through it laterally, especially radially. Beds with lateral or radial flow, compared to beds with axial flow, cause a distinct reduction in pressure drop, since they permit the setting of low linear velocities because of a greater inflow area for the gas at the same space velocity. When catalyst beds with radial flow are used, it generally has to be ensured that suitably positioned flow-conducting elements, for example sheets positioned at the ends of the radial beds, define the path of the gas such that there is at first also radial flow of the gas through the volume filled with catalyst, and it cannot escape via the ends.

In a preferred embodiment, the radial beds of one or especially preferably both reaction stages have the form of a hollow cylinder. In the latter case, the hollow cylinders are preferably concentric, in which case the hollow cylinders are in contact with one another at the outer and inner faces, or there is an empty space between them. In this embodiment, the inner hollow cylinder has a cavity in the center, through which gas can be introduced into the catalyst or conducted away from the catalyst. In one variant, the gas can be introduced axially and flows radially outward; first through the inner hollow cylinder containing the catalyst for the reduction of the $NO_X$ and then either subsequently directly through the outer hollow cylinder containing the catalyst for the breakdown of the $N_2O$ or subsequently through a cavity and subsequently through the outer hollow cylinder containing the catalyst for the breakdown of the $N_2O$. The cleaned offgas then flows through the outer shell of the outer hollow cylinder into the outlet region of the reactor and then out of the reactor. Such a configuration of the apparatus of the invention is shown in FIG. 1.

Figure 2:
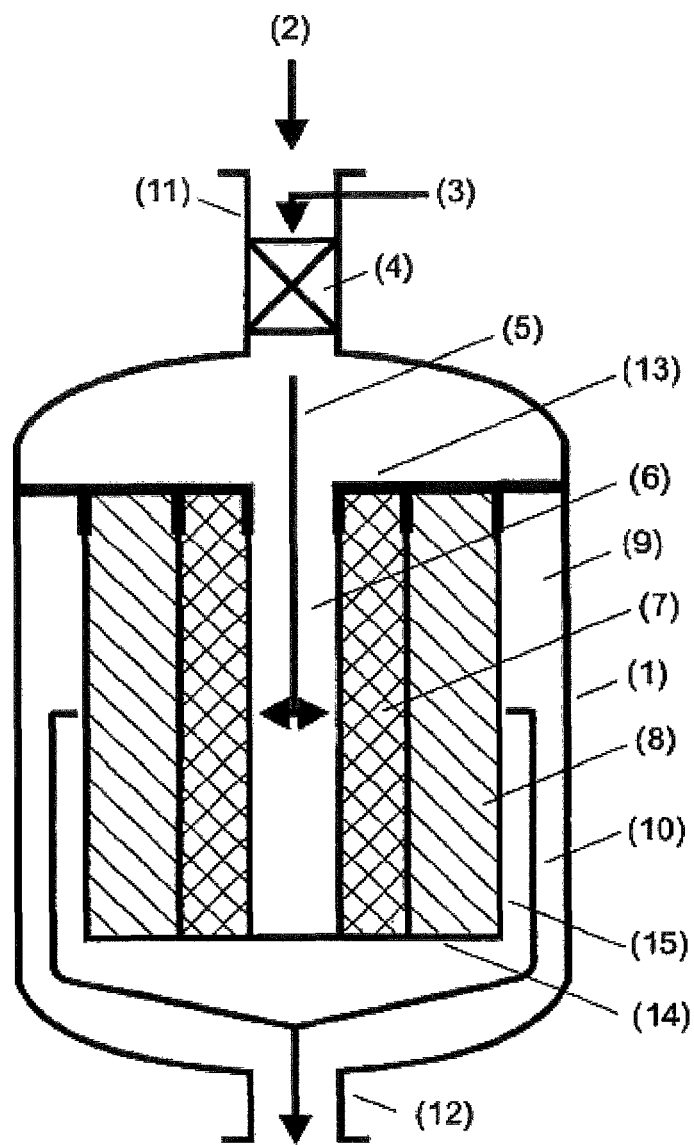
FIG. 2 is a side section view of a schematic embodiment of a reactor apparatus of the present disclosure, for reducing $NO_X$ and $N_2O$ gases from production offgases.

In another mode of operation, the flow through such an apparatus may also be in the opposite sense, in which case the outer hollow cylinder is formed from the catalyst for the reduction of the $NO_X$ and the inner cylinder from the catalyst for the breakdown of the $N_2O$. Such a configuration of the apparatus of the invention is shown in FIG. 2.

Further configurations of the reactor of the invention are shown in FIGS. 5 and 6.

Before the entry of the gas into the first catalyst bed, at least one nitrogen-containing reducing agent for the reduction of the $NO_X$ is added to the gas containing $NO_X$ and $N_2O$. The mode of introduction of the reducing agent(s) into the gas stream to be treated can be configured freely in the context of the invention. The reducing agent can be introduced in the form of a gas or else of a liquid or aqueous solution which evaporates in the gas stream to be treated. The feeding into the gas stream to be treated is effected by means of a suitable introduction apparatus, for example by means of an appropriate pressure valve or by means of appropriately configured nozzles. When various reducing agents are used, feeding and introduction into the gas to be cleaned can be effected separately or together.

In order to promote the mixing of the gas stream to be cleaned with the reducing agent supplied and to achieve very intimate distribution of the reducing agent in the gas stream upstream of entry into the $deNO_X$ stage, a mixer can be provided upstream of entry in entry into the $deNO_X$ stage, said mixer preferably being disposed in the line for the gas stream to be treated.

The mixer can be configured freely in the context of the invention, for example in the form of a static mixer with appropriate internals or in the form of a dynamic mixer. Even the simplest case of a tube with preferably turbulent flow is regarded as a mixer in the context of the invention.

In the $deNO_X$ stage, selected $deNO_X$ catalysts are used, which have the following properties within the temperature range from 350 to 600° C., especially between 400 and 600° C.:

a) a high catalytic activity and selectivity for chemical reaction of $NO_X$ with nitrogen-containing reducing agents to give $N_2$ and $H_2O$ b) a significant catalytic activity for selective oxidation of reducing agent in superstoichiometric dosage with $O_2$ and or $N_2O$ to give $N_2$ and $H_2O$ c) and, if possible, a significant activity for breakdown of $N_2O$ to $N_2$ and $O_2$.

The $deNO_X$ catalysts are catalysts which contain zeolites doped with transition metals, including the lanthanides, preferably with cobalt, especially with copper and most preferably with iron. Further possible transition metals which preferably occur together with cobalt, copper and/or iron in the zeolite are manganese, vanadium, chromium or nickel.

The zeolites are preferably "high silica" zeolites having a high hydrothermal stability.

Preferably, the zeolites are selected from the group of the MFI, BEA, FER, MOR and MEL types or mixtures thereof, preferably from the BEA and MFI types, and are more preferably a ZSM-5 zeolite.

Exact details of the formation or structure of the zeolite types used in accordance with the invention are given in the Atlas of Zeolite Structure Types, Elsevier, $4^{th}$ Revised Edition 1996, which is explicitly incorporated here by reference.

In addition, what are called "steamed" zeolites are used with preference, i.e. zeolites in which, after hydrothermal treatment, some of the aluminum lattice atoms have moved to interstitial sites. The person skilled in the art is aware of zeolites of this kind and the mode of production thereof.

The content of transition metals in the zeolites may vary within wide ranges, based on the mass of zeolite, and may, for example, be up to 25%, but preferably 0.1 to 10%, and especially 2 to 7%.

The doping of the zeolites with the transition metals can be effected, for example, proceeding from the H or preferably $NH_4$ form of the zeolites by ion exchange (in the aqueous phase or by solid-state reaction) with appropriate salts of the transition metals.

The catalyst powders obtained are typically calcined in a chamber oven under air at temperatures in the range from 400 to 650° C. After the calcining, the transition metal-containing zeolites are washed vigorously in distilled water, and the zeolite is distilled off and dried. These and other relevant methods for loading or doping zeolites with transition metals are known to those skilled in the art. Finally, the transition metal-containing zeolites thus obtained are admixed and mixed with suitable auxiliaries for plasticization and binders, for example aluminosilicates or boehmite, and extruded, for example, to give cylindrical catalyst bodies.

The $deNO_X$ catalyst may be present in the form of shaped bodies of any size and geometry, preferably in geometries which have a high ratio of surface to volume and which generate a minimum pressure drop when gas flows through them. Typical geometries are all of those known in catalysis, for example cylinders, hollow cylinders, multi-hole cylinders, rings, crushed granules, trilobes or honeycomb structures. The size of the catalyst particles or shaped catalyst bodies used may vary within wide ranges.

Typically, these have equivalent diameters in the range from 1 to 10 mm. Preference is given to equivalent diameters of 2 to 5 mm. The equivalent diameter is the diameter of a sphere of equal volume.

After the reduction of the $NO_X$, the gas to be treated is passed directly into the $deN_2O$ stage, which contains one or more catalyst bed(s) containing catalyst for the breakdown of $N_2O$ to nitrogen and oxygen.

According to the invention, in the $deN_2O$ stage(s), catalysts having in a high catalytic activity for breakdown of $N_2O$ to $N_2$ and $O_2$ within the temperature range from 350 to 600° C. are used. More particularly, catalysts used are those whose activity for $N_2O$ breakdown is distinctly limited by the presence of $NO_X$ (called $NO_X$-sensitive $deN_2O$ catalysts).

These catalysts contain one or more catalytic active compounds of elements selected from groups 5 to 11 of the Periodic Table of the Elements. Especially preferred are compounds of the elements of groups 9 to 11 of the PTE. Among these, preference is given in turn to the compounds of the elements Co, Pt, Pd, Ir, Rh, Ni and/or Cu, preferably Co, Rh, Ni and/or Cu and in this context especially Co or Rh. Excluded from the catalysts used in the $deN_2O$ stage are iron-doped zeolites. This group of catalysts does not comprise "$NO_X$-sensitive" $deN_2O$ catalysts.

The catalytically active compounds themselves may be metallic and/or oxidic compounds, where the latter may be present either in the form of singular oxides or else in the form of binary, ternary or polynary mixed oxides of different structure type, for example perovskites or spinels. These are described, for example, in Catalysis Letters 35 (1995) 372-382, Applied Catalysis 73 (1991) 165-171, Catal. Rev.-Sci. Eng.; 34(4), 409-425 (1992) or Actes du 2ième Congrès International sur la Catalyse 97 (1961) 1937-1953. It is also possible to use mixtures of various catalytically active compounds.

Examples of particularly preferred catalytically active compounds are metallic rhodium, rhodium oxides such as $RhO_2$, or $Rh_2O_3$, $CoO$, $Co_2O_3$, Co-containing spinels such as $Co_3O_4$, $Cu_xCo_{3-x}O_4$ or Co-containing perovskites such as $LaCoO_3$ or Co-containing perovskites substituted at A and B sites.

The catalytically active compounds may be present in the catalysts in pure form or may be applied to or mixed with suitable support materials.

In the first case, the catalysts are what are called unsupported catalysts which, as well as active compounds, may also contain additions known to those skilled in the art, such as binders or other production-related additions such as plasticizers, pore formers, fiber reinforcements or pressing aids. The methods for production of such catalysts are known to those skilled in the art. In the case of "supported catalysts", the catalytically active compounds have been applied to the support material. As a result of this, the catalytically active compound undergoes dispersion and stabilization with respect both to thermal and mechanical stress. The methods for production of catalysts of this kind are likewise known to those skilled in the art.

The support materials are preferably refractory oxides, such as $SiO_2$, $TiO_2$, $ZrO_2$ or $Al_2O_3$ or mixtures of two or more thereof, or materials which themselves have a certain catalytic activity for $N_2O$ breakdown, for example MgO, zeolites, hydrotalcites or mixtures of two or more thereof.

Preference is given to using $deN_2O$ catalysts containing no or essentially no zeolites, preferably less than 15% by weight of zeolites, especially less than 5% by weight of zeolites.

Preferred support materials for Rh-containing compounds are $ZrO_2$, $TiO_2$, $Al_2O_3$, hydrotalcites or zeolites, for example of the MFI type. These are described, for example, in Chemical Engineering and Technology 24 (2001) 281-285 or in Catalysis Today 35 (1997) 113-120.

Particularly preferred supports for Rh-containing compounds are $ZrO_2$, $TiO_2$ and hydrotalcites. The Rh content of these catalysts is preferably 0.1 to 10% by weight, preferably 0.5 to 5% by weight. More preferably, Rh-containing catalysts contain, as well as Rh, also $CeO_2$. The proportion of $CeO_2$ is preferably 5 to 50% by weight, especially 10 to 30% by weight.

Preferred supports for Co-containing compounds are zeolites or the preferred supports contain magnesium oxide. In the case of zeolites, particular preference is given to Si-rich structure types, such as MFI, BEA, FER, MEL or MOR. The preparation of such Co-doped zeolites is known to those skilled in the art. Magnesium oxide supports may be pure MgO or MgO-containing compounds, for example hydrotalcites. Such catalysts are described, for example, in Appl. Catal. B: Environmental 7 (1996) 397-406 or Appl. Catal. B: Environmental 13 (1997) 69-79.

Particular preference is given to catalysts which essentially of at least one oxidic magnesium compound and at least one oxidic cobalt compound, where the content of oxidic cobalt compounds is in the range from 0.1 to 50% by weight and the content of oxidic magnesium compounds is in the range from 50 to 99.9% by weight, based in each case on the total mass of the catalyst, and at least 30% by weight of the Co atoms present in the catalyst are in the chemically trivalent state. Catalysts of this kind and the preparation thereof are described in EP 1 257 347 B1.

In the case of use of oxidic Co compounds as active component, particular preference is further given to catalysts having a support consisting to an extent of at least 50% by weight of MgO or of a mixed oxide consisting to an extent of at least 50% by weight of MgO, and where a cerium oxide functional layer has been applied to the support. Catalysts of this kind and the preparation thereof are described in DE 10 2007 038 711 A1.

The $deN_2O$ catalyst may be present in the form of shaped bodies of any size and geometry, preferably in geometries which have a high ratio of surface to volume and which generate a minimum pressure drop when gas flows through them. Typical geometries are all of those known in catalysis, for example cylinders, hollow cylinders, multi-hole cylinders, rings, crushed granules, trilobes or honeycomb structures. The size of the catalyst particles or shaped catalyst bodies used may vary within wide ranges. Typically, these have equivalent diameters in the range from 1 to 10 mm. Preference is given to equivalent diameters of 1 to 4 mm. The equivalent diameter is the diameter of a sphere of equal volume.

The invention likewise relates to a method for lowering the content of $NO_X$ and $N_2O$ in gases, especially in process gases and offgases, comprising the measures of:

a) adding nitrogen-containing reducing agent to a gas stream containing $N_2O$ and $NO_X$ to reduce the $NO_X$, b) passing the gas stream containing $N_2O$, $NO_X$ and reducing agent through at least one catalyst bed of a $deNO_X$-stage (7) containing a catalyst for the reduction of $NO_X$ by the reducing agent, said catalyst containing zeolites doped with transition metals, including the lanthanides, and c) passing the gas stream leaving the deNO$_X$ stage through at least one catalyst bed of a deN$_2$O stage (8) containing a catalyst for the breakdown of the N$_2$O to N$_2$ and O$_2$, said catalyst being selected from the group of the catalysts containing one or more catalytic active compounds of elements selected from groups 5 to 11 of the Periodic Table of the Elements, excluding iron-doped zeolites.

In the region upstream of the inlet of the gas into the reactor as far as directly upstream of the catalyst bed of the (first) deNO$_X$ stage, the gas containing NO$_X$ and N$_2$O is mixed with a nitrogen-containing reducing agent for NO$_X$. This may be any nitrogen-containing reducing agent which is known to those skilled in the art and has a high activity for reduction of NO$_X$.

Examples are azanes, hydroxyl derivatives of azanes and amines, oximes, carbamates, urea or urea derivatives. Examples of azanes are hydrazine and, very particularly, ammonia. An example of a hydroxyl derivative of azanes is hydroxylamine. Examples of amines are primary aliphatic amines such as methylamine. An example of carbamates is ammonium carbamate. Examples of urea derivatives are N,N'-substituted ureas such as N,N'-dimethylurea. Ureas and urea derivatives are preferably used in the form of aqueous solutions.

Particular preference is given to using ammonia as a reducing agent for NO$_X$.

The reducing agent is added in such amounts as required for reduction of at least a portion of the NO$_X$ in the deNO$_X$ stage. The decomposition level of NO$_X$ in the process according to the invention should, based on the inlet concentration of NO$_X$, typically be more than 70%, preferably more than 80%, more preferably more than 90%, especially more than 95%.

In selecting the amount of reducing agent, it should be ensured that it is converted completely or virtually completely in the deNO$_X$ stage, so as to result in minimum slippage of the reducing agent from the deNO$_X$ stage into the deN$_2$O stage or a slippage of less than 25 ppmv, preferably of less than 10 ppmv, and especially a slippage of less than 5 ppmv. The amounts of reducing agent required for that purpose are dependent on the type of reducing agent and the type and amount of the catalyst and other operating parameters such as pressure and temperature.

In the case of ammonia as reducing agent for NO$_X$, it is customary to add such an amount of NH$_3$ as to result in, based on the NH$_3$ and NO$_X$ components at the inlet of the deNO$_X$ stage, a molar NH$_3$/NO$_X$ ratio of 0.8 to 3, preferably of 1 to 2.5, more preferably of 1.2 to 2 and especially of 1.3 to 1.8.

The amount of reducing agent for NO$_X$ can be ascertained and judged in different ways. For example, it is possible using the measurement point G) at the outlet of the deN$_2$O stage to measure the NO$_X$ content, and using a simple closed-loop control system, i.e. using the regulation unit H), to control the adjustment device I) for dosage of the reducing agent, such that the desired NO$_X$ content (target value) is established at the outlet of the deN$_2$O stage.

There are limits to this closed-loop control strategy in the process according to the invention, namely whenever the NO$_X$ content in the deNO$_X$ stage is to be reduced completely, such that the measurement point G) at the outlet of the deN$_2$O stage does not give any significant measurement parameter and hence regulation parameter.

In a preferred embodiment, therefore, the NO$_X$ content and the flow rate of the offgas, i.e. the amount thereof before entry into the deNO$_X$ stage, are measured and, with these parameters, a control unit H) with a preset suitable ratio of the amounts of reducing agent and NO$_X$ is used to determine the amount of reducing agent required and set the adjustment device I) correspondingly.

The suitable ratio of the amounts of reducing agent and NO$_X$ can be ascertained by calibration of the apparatus of the invention. Corresponding values for the molar ratio in the case of NH$_3$ as reducing agent are specified above. In the deNO$_X$ stage, the temperature in the process according to the invention is typically between 300 and 600° C., preferably between 350 and 550° C., and more preferably between 400 and 550° C.

According to the invention, the deNO$_X$ stage can be operated at standard pressure or preferably at elevated pressure. Typically, the pressure in this stage varies within the range from 1 to 50 bara, preferably from 1 to 25 bara, more preferably from 4 to 15 bara. In this context, a higher operating pressure in the deNO$_X$ stage reduces the amount of catalyst required for NO$_X$ reduction. An elevated pressure with otherwise identical operating parameters generally leads to an increased decomposition level of NO$_X$ at the outlet of the deNO$_X$ stage.

The amount of catalyst in the deNO$_X$ stage has to be such that, given appropriate addition of reducing agent, as detailed above, the desired decomposition level of NO$_X$ can be achieved, if at all possible without occurrence of slippage of reducing agent.

The amount of catalyst is dependent on the existing operating parameters in the deNO$_X$ stage, such as the volume flow rate of the gas, the operating pressure and the operating temperature. Typical space velocities in the deNO$_X$ stage vary within the range between 5000 and 200 000 h$^{-1}$, preferably between 10 000 and 100 000 h$^{-1}$, and more preferably between 20 000 and 60 000 h$^{-1}$. In the context of this description, the term "space velocity" is understood to mean the ratio of parts by volume of gas mixture (measured at 273.15 K and 1.01325 bara) per hour, based on one part by volume of catalyst. The space velocity can thus be adjusted via the volume flow rate of the gas and/or via the amount of catalyst.

According to the invention, the process parameters in the deNO$_X$ stage, i.e. space velocity, temperature and pressure, are selected within the above-specified ranges for these process parameters so as to result in, for a gas with a given NO$_X$ content, with appropriate addition of reducing agent for NO$_X$, at the outlet of the deN$_2$O stage, a residual content of NO$_X$ of less than 150 ppmv, preferably less than 100 ppmv, more preferably less than 50 ppmv, even more preferably less than 20 ppmv, especially preferably less than 10 ppmv, and extremely preferably less than 1 ppmv.

In the deN$_2$O stage, the temperature in the process according to the invention is likewise typically between 300 and 600° C., preferably between 350 and 550° C. and more preferably between 400 and 550° C. The temperature in the deN$_2$O stage is generally selected such that it differs from the temperature that exists in the deNO$_X$ stage by not more than 50° C., preferably by not more than 20° C. The temperature of the respective stage is regarded as the temperature of the gas stream immediately at the outlet of the stage in question.

According to the invention, the deN$_2$O stage too can be conducted at standard pressure or preferably at elevated pressure. Typically, the pressure in this stage varies within the range from 1 to 50 bara, preferably from 1 to 25 bara, more preferably from 4 to 15 bara. In this context, a higher operating pressure in the deN$_2$O stage reduces the amount of catalyst required for N$_2$O breakdown.

The amount of catalyst in the deN$_2$O stage is such that the desired decomposition level of N$_2$O can be achieved.

The reactor bed in the deN$_2$O stage is preferably filled with catalyst so as to result in—based on the incoming gas stream—a space velocity between 2000 and 50 000 h$^{-1}$, preferably a space velocity between 2500 and 25 000 h$^{-1}$, and more preferably a space velocity of between 3000 and 20 000 h$^{-1}$. The space velocity can, as described for the reduction of NO$_X$, be adjusted via the volume flow rate of the gas and/or via the amount of catalyst.

In the process according to the invention, the level of NO$_X$ reduction in the deNO$_X$ stage and the process parameters in the deN$_2$O stage, i.e. space velocity, temperature and pressure, are selected within the above-specified ranges for these process parameters so as to result in, for a gas having a given content of N$_2$O, at the outlet of the deN$_2$O stage(s), a reduction in the N$_2$O content down to values of less than 100 ppmv, preferably less than 50 ppmv, more preferably less than 30 ppmv and most preferably of less than 15 ppmv. Overall, very substantial decomposition of the N$_2$O is to take place.

FIGS. 1 to 6 describe preferred embodiments of the apparatus of the invention and of the method of the invention.

FIG. 1 shows an apparatus of the invention in longitudinal section, in which the two catalyst beds are configured in the form of two concentric hollow cylinders. The reactor consists of the vessel (1), equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown. The gas mixture leaves this mixer as an input stream (5), in which the gas containing nitrogen oxides and the gaseous reducing agent for NO$_X$ have been mixed homogeneously with one another. The input stream (5) is passed from the mixer (4) into the input space (6) of the reactor and flows from there through a deNO$_X$ catalyst bed (7) and then a deN$_2$O catalyst bed (8). These catalyst beds are arranged in a radial basket in the form of two concentric beds and each form a hollow cylinder. The inner face of the outer hollow cylinder directly adjoins the outer face of the inner hollow cylinder. The inner hollow cylinder forms a cavity within, which forms the output space (9) for the cleaned gas (10). After passing through the output space (9), this gas leaves the reactor through the outlet (12). To conduct the flow, the two catalyst beds (7, 8) have been provided at the top with a gas-impermeable cover (13). The other walls (15) of the radial basket are gas-permeable and have been configured, for example, as wire braids. The base (14) of the radial basket supports the catalyst beds and is configured so as to be gas-impermeable, for example as a continuous plate.

FIG. 2 shows an apparatus of the invention in longitudinal section, in which the two catalyst beds are configured in the form of two concentric hollow cylinders. The construction of this apparatus is similar to the construction of the reactor from FIG. 1. The exception here is that the gas to be cleaned flows through the catalyst beds in the opposite direction, from the inside outward. Here too, the reactor consists of the vessel (1) equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown. The gas mixture leaves this mixer as an input stream (5), in which the gas containing nitrogen oxides and the reducing agent for NO$_X$ have been mixed homogeneously with one another. The input stream (5) is passed from the mixer (4) into the input space (6) of the reactor. In this embodiment, this input space ends in the inner cavity of the hollow cylinder formed by the inner catalyst bed.

From the input space (6), the gas stream (5) to be cleaned flows through a deNO$_X$ catalyst bed (7) and then a deN$_2$O catalyst bed (8). In this embodiment too, these catalyst beds are arranged in a radial basket in the form of two concentric beds and each form a hollow cylinder. Here too, the inner face of the outer hollow cylinder directly adjoins the outer face of the inner hollow cylinder. In the present embodiment, the gas to be cleaned flows through the two catalyst beds radially, from the inside outward. The output space (9) for the cleaned gas (10) begins here at the outer face of the deN$_2$O catalyst bed (8). After passing through the output space (9), the cleaned gas (10) leaves the reactor through the outlet (12). To conduct the flow, the two catalyst beds (7, 8) here have likewise been provided at the top with a gas-impermeable cover (13); however, this has to be provided with an orifice for the passage of the input stream (5) in the center. The other walls (15) of the radial basket are gas-permeable and have been configured, for example, as wire braids. The base of the radial basket (14) has to be configured so as to be gas-impermeable, in order to assure the desired flow through the catalyst beds.

FIG. 3 describes an apparatus of the invention in longitudinal section, in which the gas to be cleaned flows first axially and then radially through two catalyst beds. The reactor consists of the vessel (1), equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown. The gas mixture leaves this mixer as an input stream (5), in which the gas containing nitrogen oxides and the reducing agent for NO$_X$ have been mixed homogeneously with one another. The input stream (5) is passed out of the mixer (4) into the input space (6) of the reactor and flows from there, in axial direction, through a deNO$_X$ catalyst bed (7), which has been set up as a horizontal bed between two gas-permeable plates (15). After flowing through the NO$_X$ catalyst bed (7), the gas which has been cleaned to remove NO$_X$ flows into an intermediate space (16) which opens into an inner cavity (17) surrounded by a cylindrical deN$_2$O catalyst bed (8). To conduct the flow, the catalyst bed (8) has been provided at the top with a gas-impermeable cover (13) which adjoins the wall of the vessel (1). The gas to be cleaned flows from the cavity (17) radially outward through the deN$_2$O catalyst bed (8) and exits at the outer face of the cylinder into the output space (9) for the cleaned gas (10). After passing through the output space (9), the cleaned gas (10) leaves the reactor through the outlet (12). In order to assure the desired flow through the catalyst bed (8), the base of the radial basket (14) is configured so as to be gas-impermeable.

FIG. 4 shows an apparatus of the invention in longitudinal section, in which the two catalyst beds are configured in the form of two horizontally arranged beds. The construction of this apparatus is similar to the construction of the reactor from FIG. 2. The only exception here is that the gas to be cleaned flows axially through two series-connected catalyst beds (7, 8). Here too, the reactor consists of the vessel (1) equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown.

The gas mixture leaves this mixer as an input stream (5), in which the gas containing nitrogen oxides and the reducing agent for NO$_X$ have been mixed homogeneously with one another. The input stream (5) is passed out of the mixer (4) into the input space (6) of the reactor and flows from there, in axial direction, through a deNO$_X$ catalyst bed (7) and a deN$_2$O catalyst bed (8) directly adjacent thereto, each of which has been set up as a horizontal bed between gas-permeable plates (15). The cleaned gas (10) exits into the output space (9) at the lower end of the deN$_2$O catalyst bed (8). After passing through the output space (9), the cleaned gas (10) leaves the reactor through the outlet (12).

Figure 5A:
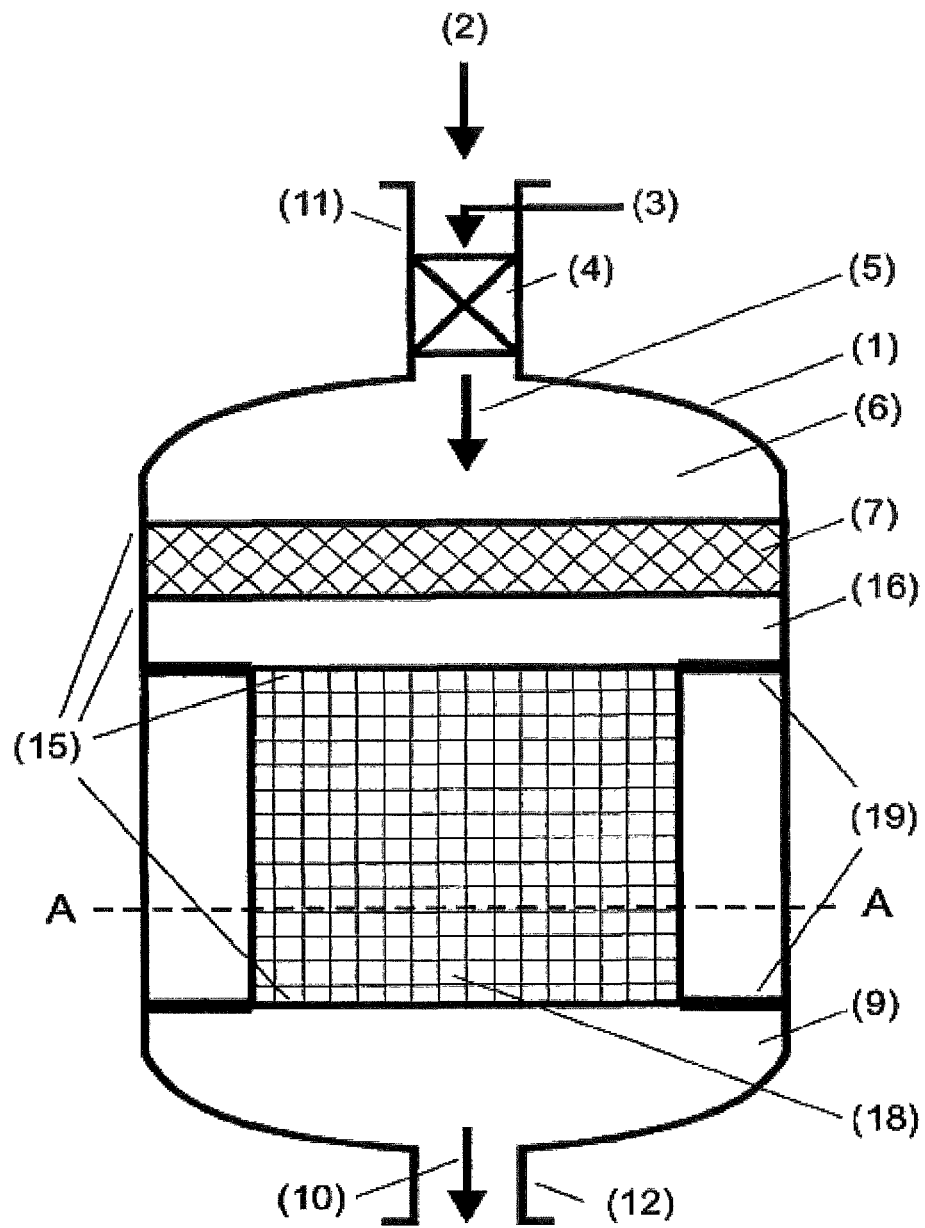
FIG. 5a is a side section view of a schematic embodiment of a reactor apparatus of the present disclosure, for reducing NO and $N_2O$ gases from production offgases.

FIG. 5a shows an apparatus of the invention in longitudinal section, in which the deNO$_X$ catalyst bed (7) is in the form of a horizontal bed, and a plurality of deN$_2$O catalyst beds (8) are present in the form of vertically arranged beds. The reactor consists of the vessel (1), equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown. The gas mixture leaves this mixer as an input stream (5), in which the gas containing nitrogen oxides and the reducing agent for NO$_X$ have been mixed homogeneously with one another. The input stream (5) is passed out of the mixer (4) into the input space (6) of the reactor and flows from there, in axial direction, through a deNO$_X$ catalyst bed (7) which is retained or bounded by gas-permeable plates (15). After passing through the deNO$_X$ catalyst bed (7), the gas which has been cleaned to remove NO$_X$ flows into an intermediate space (16) and from there through an arrangement (18) of a plurality of vertical deN$_2$O catalyst beds (8) that are not shown in detail in FIG. 5a. Arrangement (18) has a rectangular cross section and is connected at the top and bottom by mounts (19) to the shell of the vessel (1). The gas which has been cleaned to remove NO$_X$ flows through the arrangement (18) from the top downward, with breakdown of the N$_2$O present in the gas to nitrogen and oxygen. The cleaned gas (10) exits into the output space (9) and the lower end of the arrangement (18) and leaves the reactor through the outlet (12).

Figure 5B:
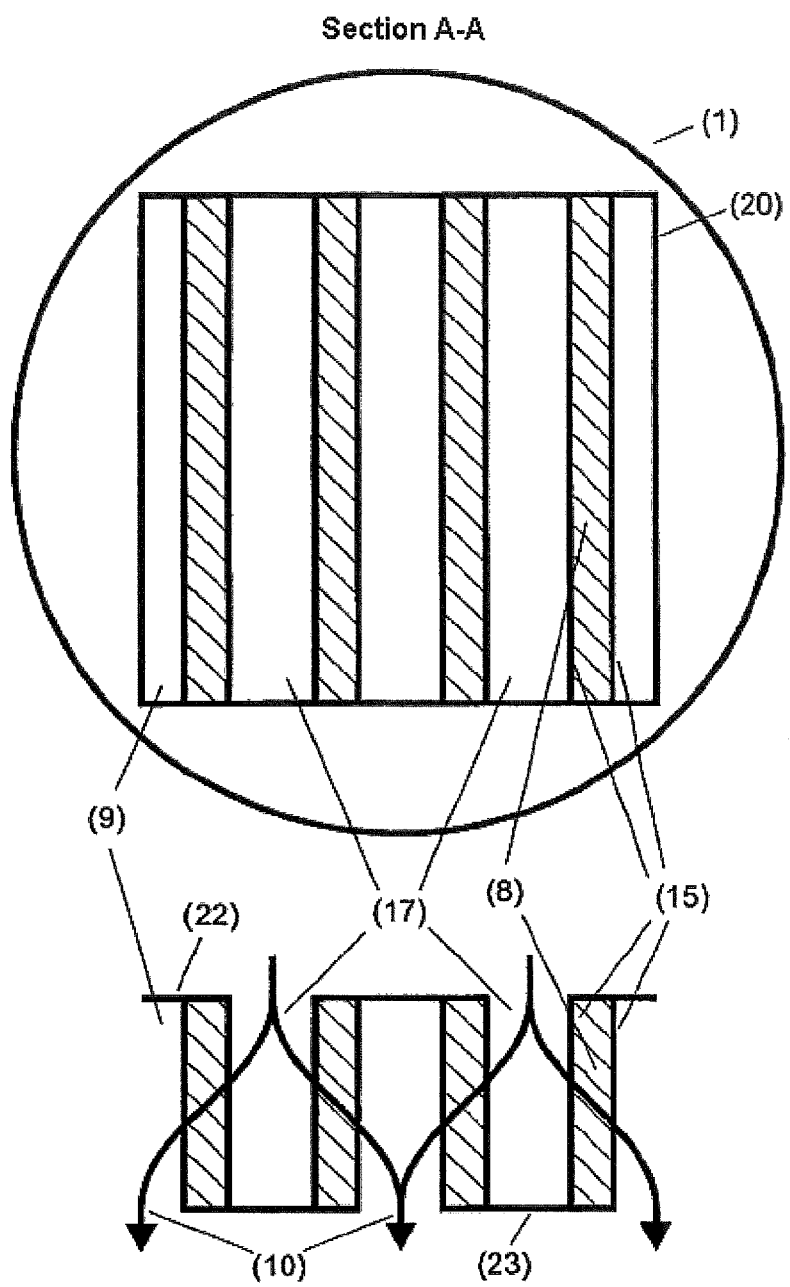
FIG. 5b is a cross section of the reactor apparatus of FIG. 5a, taken about line A-A in FIG. 5a, and a corresponding longitudinal gas flow profile through $deN_2O$ catalyst beds thereof in an embodiment of the present disclosure.

The upper part of FIG. 5b shows a section of the arrangement (18) along line A. Arrangement (18) is within the vessel (1) and forms a cuboid surrounded by plates (20).

The interior of the cuboid is formed by a sequence of vertical, directly adjoining spatial sections (8, 9, 17). These spatial sections are each bounded by gas-permeable walls (15), for example made from wire braids. Spatial sections (8) are a plurality of deN$_2$O catalyst beds which run vertically within the arrangement (18). Spatial sections (9) are output spaces for the cleaned gas (10). Spatial sections (17) are input spaces for the gas cleaned to remove NO$_X$.

The lower part of FIG. 5b shows the arrangement (18) in longitudinal section, together with a flow profile for the gas. The gas which has been cleaned to remove NO$_X$ enters from the top of the arrangement (18) through the inlet spaces (17) into the vertical deN$_2$O catalyst beds (8) and is cleaned there to remove N$_2$O. Thereafter, the cleaned gas (10) exits into the output spaces (9) and then leaves the reactor. To conduct the flow, gas-impermeable plates (22) mounted at the upper end of the arrangement (18) permit access of the gas which has been cleaned to remove NO$_X$ only into the inlet spaces (17) and not into the ends of the deN$_2$O catalyst beds (8) or into the output spaces (9). To conduct the flow, gas-impermeable sheets (23) mounted at the lower end of the arrangement (18) permit egress of the cleaned gas (10) only via the output spaces (9) and not via the ends of the deN$_2$O catalyst beds (8) and not into the inlet spaces (17).

Figure 6A:
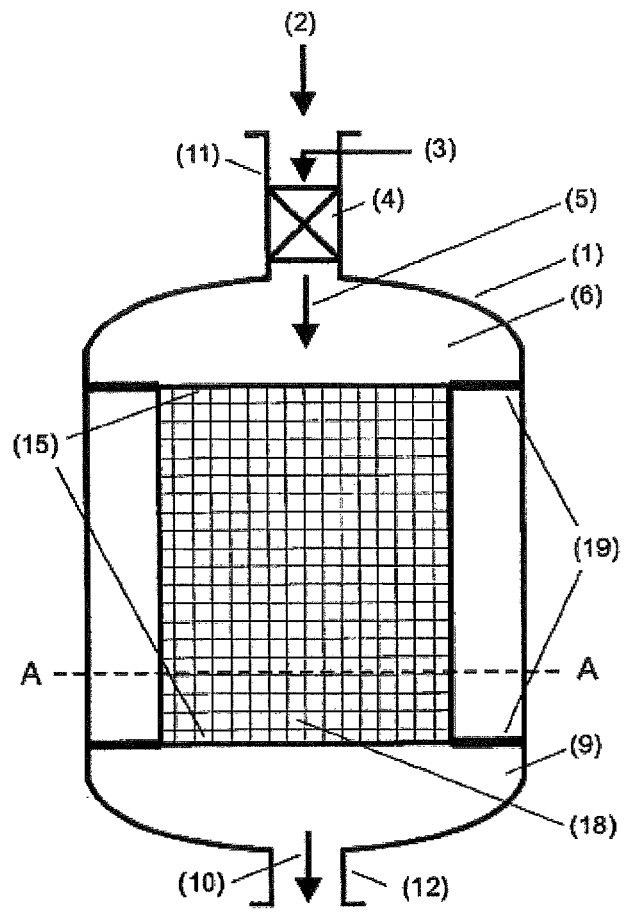
FIG. 6a is a side section view of a schematic embodiment of a reactor apparatus of the present disclosure, for reducing $NO_X$ and $N_2O$ gases from production offgases.

FIG. 6a shows an apparatus of the invention in longitudinal section, in which the two catalyst beds are configured in the form of a plurality of beds, each arranged vertically. The construction of this apparatus is similar to the construction of the reactor from FIG. 5a. The only exception here is that the gas to be cleaned flows axially through each of two series-connected catalyst beds, each arranged vertically (not shown in detail in FIG. 6a). Here too, the reactor consists of the vessel (1) equipped with inlet (11) and outlet (12) for the gas. The gas (2) which contains nitrogen oxides and is to be cleaned is fed to the reactor together with a reducing agent for NO$_X$ (3), for example ammonia, to a mixer (4) positioned in the inlet (11) via lines that are not shown. The gas mixture leaves this mixer as an input stream (5), in which the gas containing nitrogen oxides and the reducing agent for NO$_X$ have been mixed homogeneously with one another. The input stream (5) is passed out of the mixer (4) into the input space (6) of the reactor and flows from there through an arrangement (18) of a plurality of combinations, not shown in detail in FIG. 6a, of vertical deNO$_X$ and deN$_2$O catalyst beds (7, 8). Arrangement (18) has a rectangular cross section and is connected at the top and bottom by mounts (19) to the shell of the vessel (1). The gas to be cleaned flows through the arrangement (18) from the top downward, with removal of the nitrogen oxides present in the gas. The cleaned gas (10) and exits at the lower end of the arrangement (18) into the output space (9) and leaves the reactor through the outlet (12).

Figure 6B:
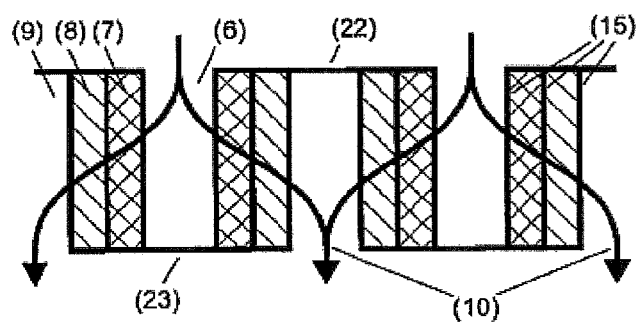
FIG. 6b is a side section view of a schematic embodiment of a gas flow profile through $deNO_X$ and $N_2O$ catalyst beds of a reactor apparatus of an embodiment of the present disclosure.

FIG. 6b shows a connection of the arrangement (18) in longitudinal section together with a flow profile for the gas. The gas to be cleaned enters the deNO$_X$ catalyst beds (7) through the inlet spaces (6) from the top of the arrangement (18), and is cleaned therein to remove NO$_X$. From each deNO$_X$ catalyst bed (7), the gas passes directly into a deN$_2$O catalyst bed (8), where the N$_2$O remaining in the gas is broken down to nitrogen and oxygen. Thereafter, the cleaned gas (10) exits into the output spaces (9) and then leaves the reactor. The catalyst beds (7, 8) are each combined to form directly adjoining pairs which run vertically within the arrangement (18) and have longitudinal sides—through which gas is also exchanged—in direct contact with one another. To conduct the flow, gas-impermeable plates (22) mounted at the upper end of the arrangement (18) permit access of the gas to be cleaned only into the inlet spaces (6) and not into the ends of the catalyst beds (7, 8) or into the output spaces (9). To conduct the flow, gas-impermeable plates (23) mounted at the lower end of the arrangement (18) permit egress of the cleaned gas (10) only via the output spaces (9) and not via the ends of the catalyst beds (7, 8) and not into the inlet spaces (6). The catalyst beds (7, 8) are bounded laterally by gas-permeable walls (15) configured, for example, as wire braids.

Figure 6C:
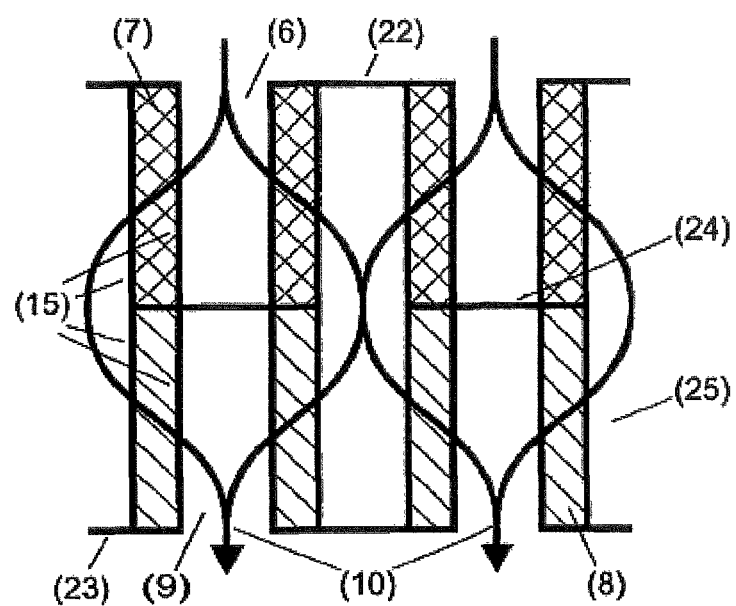
FIG. 6c is a side section view of a schematic embodiment of a gas flow profile through $deNO_X$ and $deN_2O$ catalyst beds of a reactor apparatus of an embodiment of the present disclosure.

FIG. 6c shows an alternative connection of the arrangement (18) in longitudinal section, together with a flow profile for the gas. The gas to be cleaned enters the deNO$_X$ catalyst beds (7) through the inlet spaces (6) from the top of the arrangement (18), and is cleaned therein to remove NO$_X$. From each deNO$_X$ catalyst bed (7), the gas exits into an intermediate space (25) and is then passed into a deN$_2$O catalyst bed (8), where the N$_2$O remaining in the gas is broken down to nitrogen and oxygen. Thereafter, the cleaned gas (10) exits into the output spaces (9) and then leaves the reactor. The catalyst beds (7, 8) are each combined to form directly adjoining pairs which run vertically within the arrangement (18) and have ends—through which no gas is exchanged—in direct contact with one another. To conduct the flow, gas-impermeable plates (22) mounted at the upper end of the arrangement (18) permit access of the gas to be cleaned only into the inlet spaces (6) and not into the ends of the catalyst beds (7), not into the intermediate spaces (25) and not into the output spaces (9). To conduct the flow, gas-impermeable plates (23) mounted at the lower end of the arrangement (18) permit egress of the cleaned gas (10) only via the output spaces (9) and not via the ends of the catalyst beds (8), not into the intermediate spaces (25) and not into the inlet spaces (6). In addition, to conduct the flow, gas-impermeable plates (24) mounted in the middle of the arrangement (18) between the ends of the catalyst beds (7, 8) and between the inlet spaces (6) and the output spaces (9) permit the passage of the gas to be cleaned only from the deNO$_X$ catalyst beds (7) into the intermediate spaces (25) and from there into the deN$_2$O catalyst beds (8), and not the direct passage of the gas from the inlet spaces (6) into the output spaces (9). The catalyst beds (7, 8) are bounded laterally by gas-permeable walls (15) configured, for example, as wire braids.

The experiments and working examples which follow elucidate the method of the invention and the apparatus of the invention or individual elements thereof, without any intention of a restriction.

EXPERIMENTS 1 TO 3

Reduction of NO$_X$ by Means of NH$_3$ Over Iron-Zeolite Catalysts at Different Temperatures Experiments 1 to 3, the results of which are reproduced in FIGS. 7 to 9, demonstrate, using the example of an iron-doped zeolite catalyst, the unique effect of the inventive deNO$_X$ stage and of the catalysts used therein for NO$_X$ reduction within the temperature range from 360 to 500° C. The catalysts used in experiments 1 to 3 were iron-laden zeolites of the ZSM-5 type, which had been prepared by solid-state ion exchange proceeding from ZSM-5 zeolite powder in ammonium form. Further details of the preparation can be taken from M. Rauscher, K. Kesore, R. Mönnig, W. Schwieger, A. Tissler, T. Turek: "Preparation of highly active Fe-ZSM-5 catalyst through solid state ion exchange for the catalytic decomposition of N$_2$O" in Appl. Catal. 184 (1999) 249-256. The catalyst powder obtained was calcined under air at 823 K for 6 h, washed and dried at 383 K overnight. Addition of appropriate binders was followed by extrusion to give cylindrical catalyst bodies.

The catalyst pellets were introduced into a tubular reactor of a pilot plant, which was connected to a real offgas from a nitric acid plant. The operating temperature in the reaction zones was set by heating. The gas streams entering and leaving the reactor were analyzed with the aid of an FTIR gas analyzer (from Ansyco) or with a paramagnetic measurement for the oxygen content.

The exact experimental and operating conditions can be found in table 1 below.

TABLE 1

Operating conditions for experiments 1 to 3

| | | | Experiment | | |
|---|---|---|---|---|---|
| | | | 1 | 2 | 3 |
| Process parameter | T | ° C. | 360 | 430 | 500 |
| | SV*) | h$^{-1}$ | 30 000 | 40 000 | 50 000 |
| | P | bara | 6.5 | 6.5 | 6.5 |
| Offgas composition at the inlet into the pilot reactor | NO$_x$ | ppmv | 500 | 525 | 520 |
| | N$_2$O | ppmv | 745 | 715 | 980 |
| | H$_2$O | % by vol. | 0.32 | 0.34 | 0.36 |
| | O$_2$ | % by vol. | 0.74 | 0.74 | 0.48 |

*)SV = space velocity

The results of experiments 1 to 3 are reproduced in FIGS. 7 to 9. The legend from FIG. 7 applies equally to FIGS. 8 and 9. The label "out" in the legend refers in each case to the concentration at the outlet from the reactor. As is apparent, the NH$_3$ reducing agent, for complete reduction of the NO$_X$, can be dosed without any problem even in significantly superstoichiometric amounts without occurrence of NH$_3$ slippage.

EXPERIMENTS 4 AND 5

Inhibiting Effect of NO$_X$ on the Catalytic Breakdown of N$_2$O in the Case of an NO$_X$-Sensitive deN$_2$O Catalyst FIG. 10 demonstrates, using the example of a catalyst which has been prepared analogously to the working example of EP 1 257 347 B1 and, after heat treatment, had a mass ratio of the resulting oxides Co$_3$O$_4$:MgO=3:7, the inhibiting effect of NO$_X$ on the catalytic breakdown of N$_2$O. Thus, under the conditions selected (cf. table 2 below), the temperature which was required for the breakdown of N$_2$O is about 100 K higher in the presence of 1000 ppmv of NO$_X$ than without NO$_X$.

TABLE 2

Experimental conditions for experiments 4 and 5

| | | Experiment | |
|---|---|---|---|
| | | 4 | 5 |
| Cat | | Co$_3$O$_4$/MgO | Co$_3$O$_4$/MgO |
| SV*) | h$^{-1}$ | 10 000 | 10 000 |
| Gas composition | | | |
| N$_2$O | ppmv | 2000 | 2000 |
| O$_2$ | % by vol. | 2.5 | 2.5 |
| H$_2$O | % by vol. | 0.5 | 0.5 |
| NO$_x$ | ppmv | 0 | 1000 |
| N$_2$ | | remainder | remainder |

*)SV = space velocity

EXAMPLES 1 (INVENTIVE) AND 2 (COMPARATIVE)

The effect of the method of the invention/of the apparatus of the invention is illustrated by the examples which follow.

In a pilot plant with two series-connected tubular reactors, which was connected to a real offgas from a nitric acid plant, a deNO$_X$ catalyst was introduced into the first stage and an NO$_X$-sensitive deN$_2$O catalyst the second stage.

Upstream of the first stage, NH$_3$ was added as reducing agent for NO$_X$.

The gas streams entering and leaving the reactor were analyzed with the aid of an FTIR gas analyzer (from Ansyco) or with a paramagnetic measurement for the oxygen content. The operating temperature in the reaction stages was set by preheating the gas stream entering the tubular reactors and by auxiliary heating of the reaction zone.

The NO$_X$-sensitive deN$_2$O catalyst used in the deN$_2$O stage was a Co$_3$O$_4$/MgO-based catalyst in tablet form, which was produced analogously to the working example in the patent specification EP 1 257 347 B1 and had a mass ratio of the resulting oxides Co$_3$O$_4$:MgO of 3:7. The amount of catalyst was selected so as to result in, based on the bed volume of the deN$_2$O catalyst, a space velocity of 20 000 h$^{-1}$. The temperature of the deN$_2$O stage was 500° C.

In the deNO$_X$ stage, firstly (example 1), an extruded iron-laden zeolite of the ZSM-5 type was used, as had also already been used for experiments 1 to 3. The amount of catalyst was selected so as to result in, based on the volume of the bed of the catalyst, a space velocity of 50 000 h$^{-1}$. The temperature of the deN$_2$O stage was likewise 500° C.

Secondly (example 2, comparative), a conventional SCR catalyst based on $V_2O_5$—$WO_3/TiO_2$ from Ceram in granule form was used in the deNO$_X$ stage. For this purpose, corresponding full honeycombs of the catalyst had been crushed to a small size and, after sieving off the fines, had been introduced into the tubular reactor. The amount of catalyst was selected so as to result in, based on the volume of the bed of the deNO$_X$ catalyst, a space velocity of 48 000 h$^{-1}$. The temperature of the deNO$_X$ stage was set by closed-loop control to 260° C., such that the exiting gas stream in this case had to be heated up again prior to entry into the deN$_2$O stage.

The exact experimental and operating conditions can be found in table 3 below. FIG. 11 illustrates the experimental results obtain.

TABLE 3

Experimental conditions for examples 1 and 2

| | | Example | | |
|---|---|---|---|---|
| | | 1 | | 2 |
| | | Stage | | |
| | | deNO$_x$ | deN$_2$O | deNO$_x$ | deN$_2$O |
| Cat. | | Fe-ZSM-5 | Co$_3$O$_4$/MgO | V$_2$O$_5$—WO$_3$/TiO$_2$ | Co$_3$O$_4$/MgO |
| SV*) | h$^{-1}$ | 50 000 | 20 000 | 48 000 | 20 000 |
| T | ° C. | 500 | 500 | 260 | 500 |

*)SV = space velocity

As can be seen from FIG. 11, a much higher N$_2$O conversion is achieved in inventive example 1 than in comparative example 2. Surprisingly, in inventive example 1 compared to example 2 in which the Co$_3$O$_4$/MgO has been preceded upstream by a conventional deNO$_X$ catalyst based on V$_2$O$_5$—WO$_3$/TiO$_2$, the N$_2$O decomposition achieved is also more or less independent, within a wide range, of the NO$_X$ content at the outlet of the deN$_2$O stage. The method of the invention or the apparatus of the invention thus enables the simultaneous removal of N$_2$O and NO$_X$ from gases with high decomposition rates. This is not possible in the comparative example since, in the case of high NH$_3$ dosage here, i.e. at least at a ratio of $[NH_3]_{in}:[NO_X]_{out}$ of $\geq 1$, NH$_3$ slippage from the deNO$_X$ stage occurs, which leads to at least partial formation of NO$_X$ in the deN$_2$O stage. This in turn causes not just an increase in NO$_X$ outlet concentration but also inhibition of the N$_2$O decomposition in the deN$_2$O stage and hence a severe decline in the N$_2$O decomposition.

The invention claimed is:

1. An apparatus for lowering the content of NO$_X$ and N$_2$O in gas to be cleaned, comprising:
   a vessel having an interior cavity defining a gaseous flow direction from a gas inlet of said vessel to a gas outlet of said vessel, said vessel configured to permit a gas to be cleaned to flow there through from said inlet to said outlet and reduce the amount of NO$_X$ and N$_2$O contained in the gas to be cleaned;
   an reducing-agent feed apparatus configured to introduce of a nitrogen-containing reducing agent into a stream of the gas to be cleaned;
   a deNO$_X$ reaction stage through which the gas to be cleaned may flow, said deNOx reaction stage being disposed within the interior cavity of said vessel and downstream of said reducing-agent feed apparatus and configured to reduce the amount of NO$_X$ gas present in the gas to be cleaned, said deNO$_X$ stage including at least one catalyst bed, said at least one catalyst bed including at least one NO$_X$ removal catalyst bed containing a nitrogen-containing reducing agent for the reduction of NO$_X$, the nitrogen-containing reducing agent containing zeolites doped with transition metals including the lanthanides; and
   a deN$_2$O reaction stage through which the gas to be cleaned may flow, said deN$_2$O reaction stage being disposed within the interior cavity of said vessel and downstream of and in gaseous communication with the deNO$_X$ stage and configured to reduce the amount of N$_2$O gas present in the gas to be cleaned, said deN$_2$O stage including at least one catalyst bed, said at least one catalyst bed including at least one N$_2$O removal catalyst bed containing a catalyst configured to remove N$_2$O by catalytic breakdown of N$_2$O into N$_2$ and O$_2$, the catalyst in the at least one N$_2$O removal catalyst bed containing less than 15% by weight of zeolites and further containing one or more catalytic active compounds of elements selected from groups 5 to 11 of the Periodic Table of the Elements, excluding iron-doped zeolites.

2. The apparatus of claim 1, further comprising:
   a mixer in gaseous communication with said vessel and disposed upstream of the deNO$_X$ stage, said mixer configured to mix the gas to be cleaned and the nitrogen-containing reducing agent, and thereafter pass the mixed gas into the deNO$_X$ stage.

3. The apparatus of claim 1, further comprising:
   a plurality of measuring devices in gaseous communication with said vessel and configured to take measurements of at least one of a flow rate of the gas to be cleaned, a volume of the gas to be cleaned, a concentration of NO$_X$ in either of a gas to be cleaned or partially cleaned gas, and a concentration of one of the individual components of NO$_X$ in either of a gas to be cleaned or partially cleaned gas, said measuring devices being disposed in at least one of a location upstream of the deNOx stage, downstream of the deNO$_X$ stage but upstream of the deN$_2$O stage, or downstream of the deN$_2$O stage.

4. The apparatus of claim 3, wherein one of said measuring devices is positioned upstream of the deNO$_X$ stage in the inlet of said vessel.

5. The apparatus of claim 3, wherein a measuring device configured to determine an amount of reducing agent to be fed to said vessel is controllably coupled to an adjustment device configured to adjust the amount of the reducing agent flowing through said reducing-agent feed apparatus.

6. The apparatus of claim 1, wherein at least one catalyst bed in each of said deNO$_X$ and deN$_2$O reaction stages is a hollow cylinder such that the gas to be cleaned flows through said cylindrical catalyst beds in a radial direction.

7. The apparatus of claim 6, wherein the catalyst beds of said deNO$_X$ and deN$_2$O reaction stages are a pair of concentric hollow cylinders, wherein an outer hollow cylinder contains a catalyst for NO$_X$ reduction with catalyst particles having an equivalent diameter of about 2 to 5 mm, and wherein an inner hollow cylinder contains a catalyst for N$_2$O breakdown with catalyst particles having an equivalent diameter of about 1 to 4 mm.

8. The apparatus of claim 1, wherein the at least one catalyst bed in said deNO$_X$ stage includes at least one of Co-, Cu-, or Fe-doped zeolites.

9. The apparatus of claim 1, wherein the at least one catalyst bed in said deN$_2$O stage includes at least one of catalytic active compounds of elements selected from groups 9 to 11 of the Periodic Table of the Elements.

10. The apparatus of claim 9, wherein the catalytic active compounds are present in deN$_2$O catalysts in pure form.

11. A method for lowering the content of $NO_X$ and $N_2O$ in gases, comprising:
- adding nitrogen-containing reducing agent to a gas stream containing $N_2O$ and $NO_X$ to reduce the $NO_X$;
- passing the gas stream containing $N_2O$, $NO_X$, and reducing agent through at least one $deNO_X$ stage catalyst bed containing a catalyst for the reduction of $NO_X$ by the reducing agent, the catalyst containing zeolites doped with transition metals, including lanthanides, with conversion of $NO_X$ occurring by a reduction of $NO_X$ with the nitrogen-containing reducing agent; and
- passing the gas stream that is leaving the deNOx stage through at least one catalyst bed of a $deN_2O$ stage that contains a catalyst for the breakdown of $N_2O$ to $N_2$ and $O_2$, the $deN_2O$ stage catalyst being selected from the group of the catalysts containing one or more catalytic active compounds of elements selected from groups 5 to 11 of the Periodic Table of the Elements, excluding iron-doped zeolites, with conversion of $N_2O$ by catalytic breakdown of $N_2O$ to $N_2$ and $O_2$.

12. The method of claim 11, wherein an amount of the reducing agent is selected such that it is converted in the $deNO_X$ stage so as to result in a slippage of less than 25 ppmv of the reducing agent from the $deNO_X$ stage into the $deN_2O$ stage.

13. The method of claim 11, wherein the reducing agent for $NO_X$ is ammonia, and which is added in such an amount as to result in, based on the $NH_3$ and $NO_X$ components at the inlet of the $deNO_X$ stage, a molar $NH_3/NO_X$ ratio of 0.8 to 3.

14. The method of claim 11, wherein the nitrogen-containing reducing agent is added to the gas stream containing $N_2O$ and $NO_X$ in such an amount that the decomposition level of $NO_X$, based on the inlet concentration of $NO_X$, is more than 70%, and in the $deN_2O$ stage, space velocity, temperature, and pressure are selected such that the gas at the output of the $deN_2O$ stage has an $N_2O$ content of less than 100 ppmv.

15. The method of claim 11, further comprising:
- measuring the $NO_X$ content of gas exiting the $deN_2O$ stage by a measuring device disposed at an outlet thereof;
- regulating the amount of reducing agent added for $NO_X$ based on the measured $NO_X$ content of gas exiting the $deN_2O$ stage, said regulating occurring by use of a regulation unit to control an adjustment device for dosage of the reducing agent, such that the desired $NO_X$ content is established at the outlet of the $deN_2O$ stage.

16. The method of claim 11, wherein the temperature in the $deNO_X$ stage and in the $deN_2O$ stage is between 300 and 600° C., and wherein the difference between the temperature of the $deN_2O$ stage and the temperature of the $deNO_X$ stage is no greater than 50° C., and wherein the pressure in each of the $deNO_X$ stage and the $deN_2O$ stage is in the range from 1 to 50 bara, and wherein the process is conducted in the $deNO_X$ stage at space velocities of 5,000 to 200,000 $h^{-1}$.

17. The method of claim 11, wherein the process is conducted in the $deN_2O$ stage at space velocities of 2,000 to 50,000 $h^{-1}$.

* * * * *